United States Patent [19]
Sakamoto et al.

[11] Patent Number: 5,410,469
[45] Date of Patent: Apr. 25, 1995

[54] DIAGNOSTIC METHOD FOR PRODUCTION LINE

[75] Inventors: Shunji Sakamoto, Higashi-hiroshima; Toshihiko Hoshino, Hiroshima, both of Japan

[73] Assignee: Mazda Motor Corporation, Hiroshima, Japan

[21] Appl. No.: 270,225

[22] Filed: Jul. 1, 1994

Related U.S. Application Data

[63] Continuation of Ser. No. 753,610, Aug. 30, 1991, abandoned.

[30] Foreign Application Priority Data

Aug. 31, 1990 [JP] Japan .................. 2-231846
Nov. 13, 1990 [JP] Japan .................. 2-304023

[51] Int. Cl.[6] .............................................. G05B 1/04
[52] U.S. Cl. .................... 364/138; 364/550; 364/184
[58] Field of Search ................... 364/138, 550, 184

[56] References Cited

U.S. PATENT DOCUMENTS 4,456,960 6/1984 Wakai ..................... 364/184
4,802,094 1/1989 Nakamura et al. ...... 364/550
4,965,742 10/1990 Skeirik ..................... 364/138
5,006,976 4/1991 Jundt ....................... 364/138

FOREIGN PATENT DOCUMENTS 20051861 5/1982 European Pat. Off. .
WO84/02592 7/1984 Germany .
3605152 9/1986 Germany .
63-254501 10/1988 Japan .
63-257054 10/1988 Japan .
2168174 6/1986 United Kingdom .

*Primary Examiner*—Emanuel T. Voeltz
*Assistant Examiner*—Thomas Peeso

[57] ABSTRACT

A diagnostic method for a production line. The production line is in accordance with a ladder program, which is prepared on the basis of a map describing the operations of equipment composed of a plurality of drive devices. The method comprises the steps of: storing reference operation times necessary for executing the respective operations of the program elements of the ladder program; comparing the time it has actually taken a change to take place in the ON/OFF condition of each of confirmation devices for confirming the operations of the drive devices with the corresponding reference operation time; and locating, on the basis of the results of this comparison, any malfunctioning point of the production line.

18 Claims, 31 Drawing Sheets

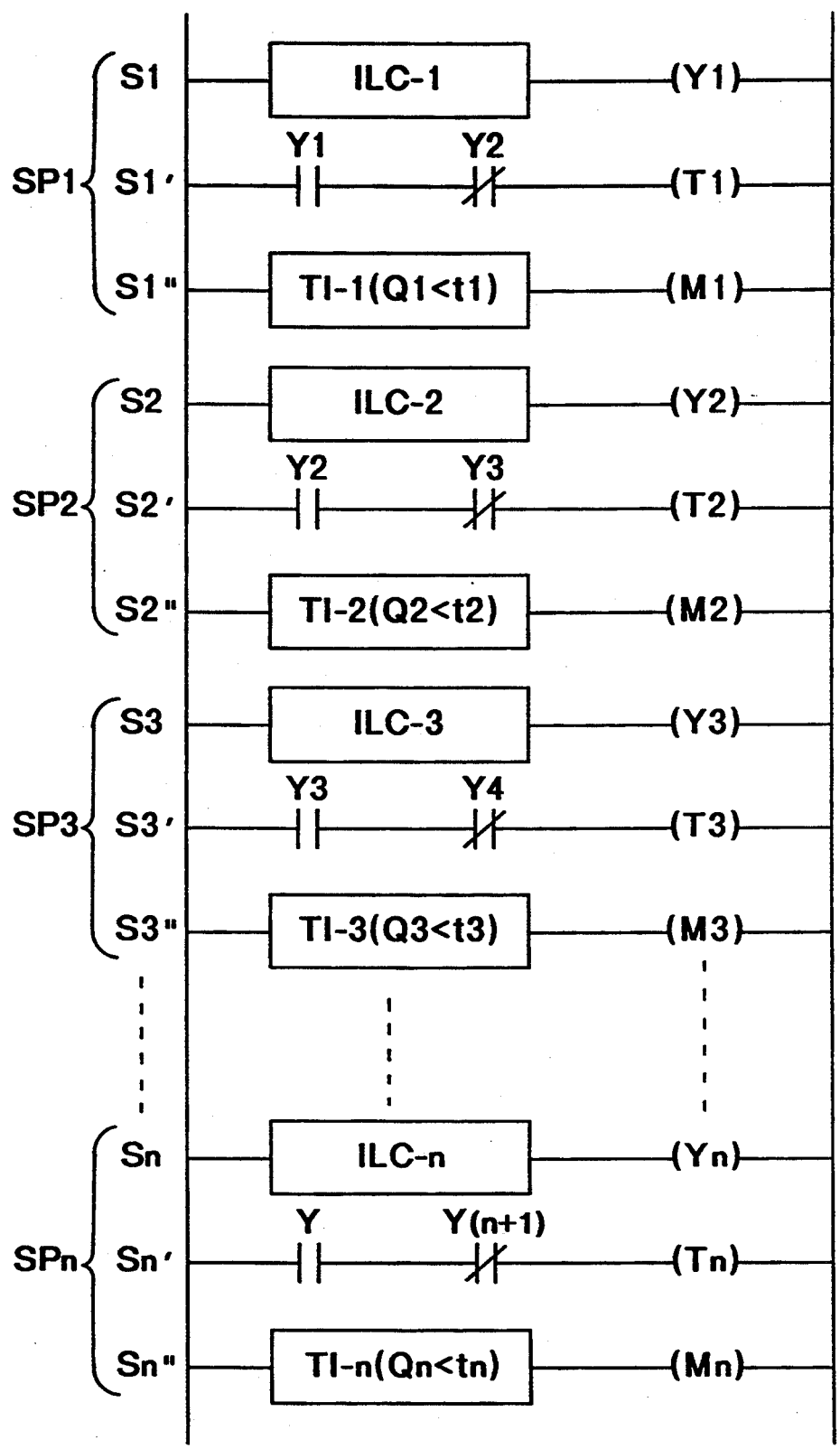
F I G. 2

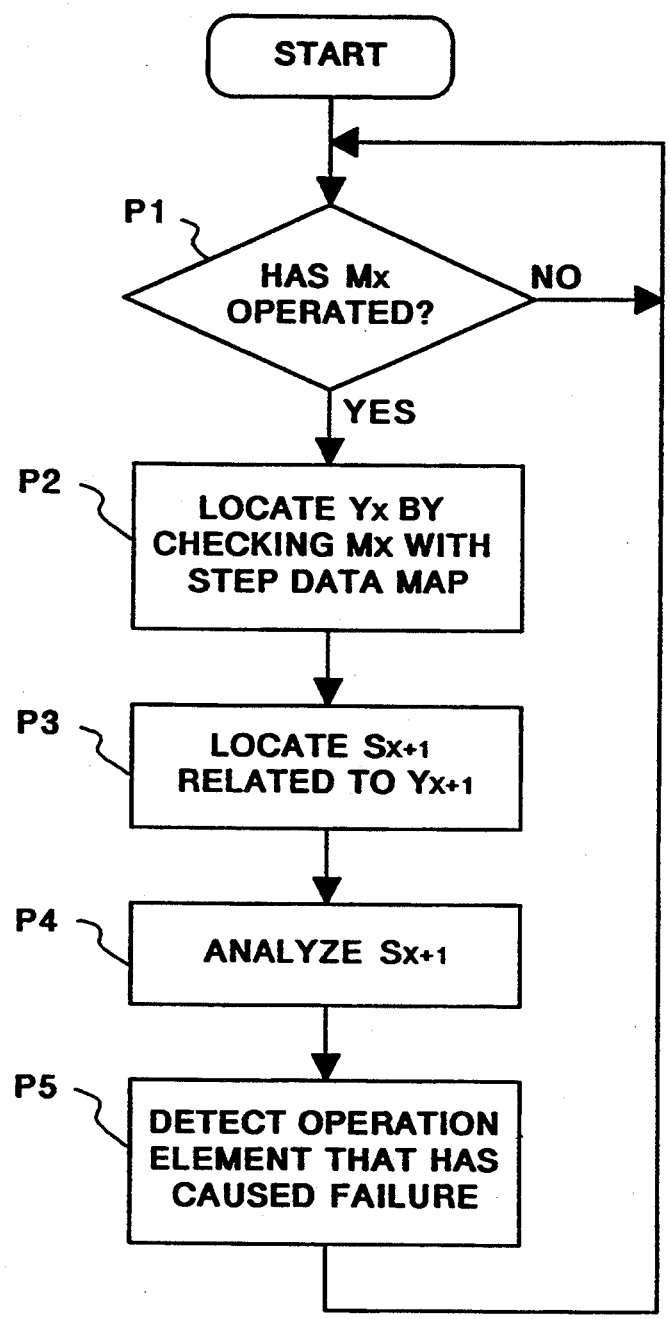
F I G. 4

FIG. 10

| No. | SC-REG | BLOCK NAME | FROM | TO | CLEAR CONDITION | EQUIPMENT | Γ |
|---|---|---|---|---|---|---|---|
| B0 | D1000 | RECEIVING STAND POSITIONING | BODY PRESENT ON STAND | B3 | B5 | 19 | $\Gamma_0$ |
| B1 | D1001 | TRANSFER DEVICE PREPARING | BODY PRESENT ON STAND | B3 | B7 | 16 | $\Gamma_1$ |
| B2 | D1002 | STRUT CLAMPING PREPARING | BODY PRESENT IN ST2 | B4 | B8 | 40 | $\Gamma_2$ |
| B3 | D1003 | TRANSFER DEVICE RECEIVING | B0, B1 | B5, B6 | B7 | 19, 16 | $\Gamma_{03}, \Gamma_{13}$ |
| B4 | D1004 | SLIDE DEVICE PREPARING | B2 | B6 | B7, B8 | 45 | $\Gamma_{24}$ |
| B5 | D1005 | RECEIVING STAND RETURNING | B3 | - | B5 | 19 | $\Gamma_{35}$ |
| B6 | D1006 | ENGINE/SUSPENSION DOCKING | B3, B4 | B7, B8 | B7, B8 | 16, 40, 45 | $\Gamma_{36}, \Gamma_{46}$ |
| B7 | D1007 | TRANSFER DEVICE RETURNING | B6 | - | B7 | 16 | $\Gamma_{67}$ |
| B8 | D1008 | CLAMP ARM RETURNING | BODY PRESENT IN ST2 | - | B8 | 40 | $\Gamma_{68}$ |
| B9 | D1009 | LINEAR MOTOR DRIVING | BODY PRESENT IN ST2 | - | B9 | 17 | $\Gamma_9$ |
| B10 | D1010 | SCREWING ① | BODY PRESENT IN ST3 | - | B10 | 48A | $\Gamma_{10}$ |
| B11 | D1011 | SCREWING ② | BODY PRESENT IN ST3 | - | B11 | 48B | $\Gamma_{11}$ |

| No. | COMMENT | OPERATION | OUTPUT COIL DEVICE | CONF. INPUT CONTACT | MANUAL INPUT CONTACT | ORIGINAL POSITION | INTERRELATIONSHIP |
|---|---|---|---|---|---|---|---|
| A01 | WORK PRESENT | - | - | X0 | XA | - | |
| A02 | BF(POSITIONING) | OUT | Y1 | X1 | XB | | A03 |
| A03 | BF(POSITIONING) | RETURN | Y2 | X2 | XC | ○ | A02 |
| A04 | BR(POSITIONING) | OUT | Y3 | X3 | XD | | A05 |
| A05 | BR(POSITIONING) | RETURN | Y4 | X4 | XE | ○ | A04 |
| A06 | TL(POSITIONING) | OUT | T5 | X5 | XF | | A07 |
| A07 | TL(POSITIONING) | RETURN | Y6 | X6 | X10 | ○ | A06 |
| A08 | FR (REF. PIN) | OUT | Y7 | X7 | X11 | | A09 |
| A09 | FR (REF. PIN) | RETURN | Y8 | X8 | X12 | ○ | A08 |
| A10 | FL (REF. PIN) | OUT | Y9 | X9 | X13 | | A11 |
| A11 | FL (REF. PIN) | RETURN | YA | XA | X14 | ○ | A10 |
| A12 | RR (REF. PIN) | OUT | YB | XB | X15 | | A13 |
| A13 | RR (REF. PIN) | RETURN | YC | XC | X16 | ○ | A12 |
| A14 | RL (REF. PIN) | OUT | YD | XD | X17 | | A15 |
| A15 | RL (REF. PIN) | RETURN | YE | XE | X18 | ○ | A14 |

FIG. 11

| No. | COMMENT | OPER-ATION | OUTPUT COIL | CONF. INPUT CONTACT | MANUAL INPUT CONTACT | ORIGINAL POSITION | RETURN CONF. CONTACT | SIMUL-TANEOUS OPER-ATION | OPER-ATION PERIOD | ACTUA-TOR No. | INTER-MEDIATE OUTPUT |
|---|---|---|---|---|---|---|---|---|---|---|---|
| B000 | OPERATION BLK. PREPARING | | | | | | | | $T_0$ | | |
| B0S0 | CONDITION CONFIRMATION | - | Y0 | X0 | XA | | | | $T_{00}$ | A01 | MY0 |
| B0S1 | BF(POSITIONING) | OUT | Y1 | X1 | XB | | X8 | | $T_{01}$ | A02 | MY1 |
| B0S2 | BR(POSITIONING) | OUT | Y2 | X2 | XC | | X9 | | $T_{02}$ | A04 | MY2 |
| B0S3 | TL(POSITIONING) | OUT | Y3 | X3 | XD | | | | $T_{03}$ | A06 | MY3 |
| B0S4 | FR (REF. PIN) | OUT | Y4 | X4 | XE | | | 1 | $T_{04}$ | A08 | MY4 |
| B0S5 | FL (REF. PIN) | OUT | Y5 | X5 | XF | | | 1 | $T_{05}$ | A10 | MY5 |
| B0S6 | RR (REF. PIN) | OUT | Y6 | X6 | X10 | | | 1 | $T_{06}$ | A12 | MY6 |
| B0S7 | RL (REF. PIN) | OUT | Y7 | X7 | X11 | | | 1 | $T_{07}$ | A14 | MY7 |
| B0S8 | BF (RETURNING) | RETURN | Y8 | X8 | X12 | ○ | | | $T_{08}$ | A03 | MY8 |
| B0S9 | BR (RETURNING) | RETURN | Y9 | X9 | X13 | ○ | | | $T_{09}$ | A05 | MY9 |
| B999 | OPERATION BLK COMPLETED | | | | | | | | | | |

FIG. 12

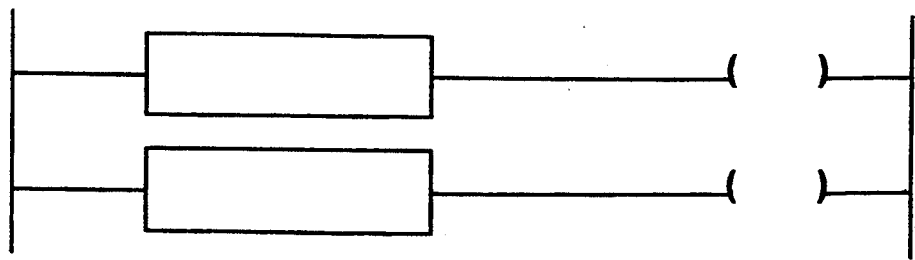
F I G. 14A
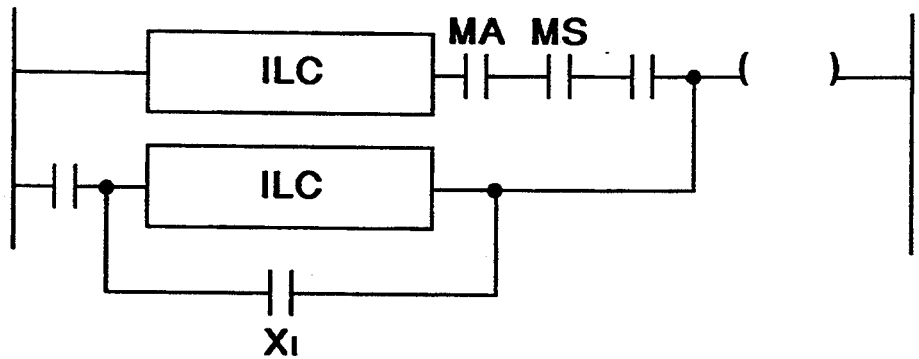
F I G. 14B
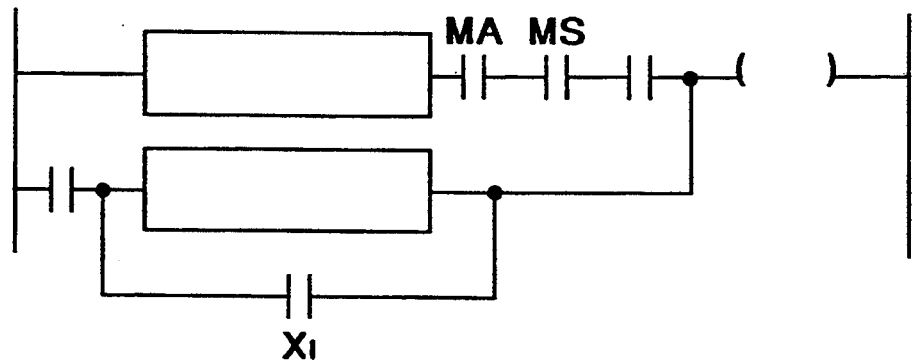
F I G. 14C

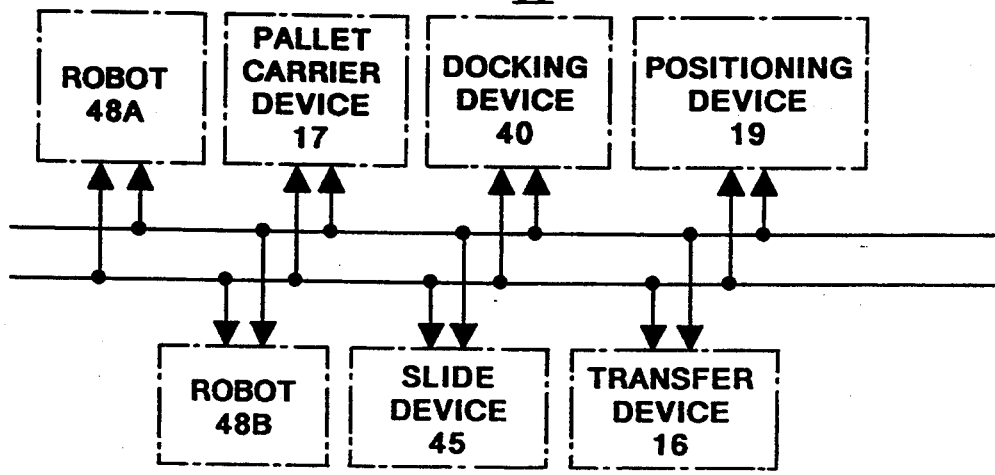
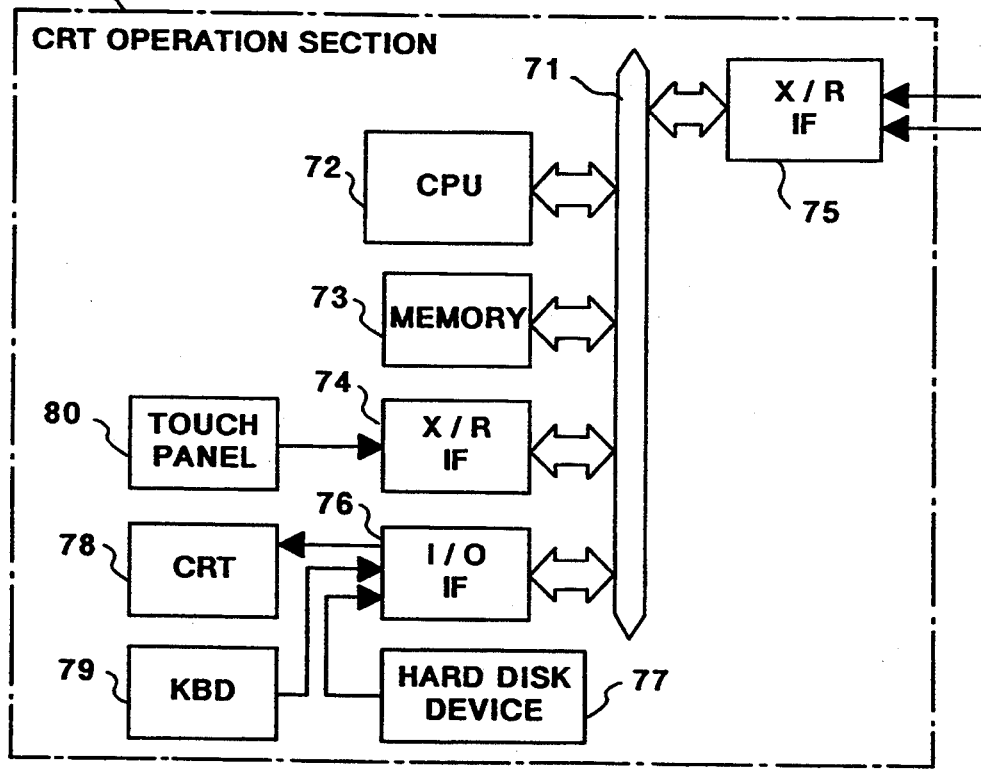
FIG. 16A

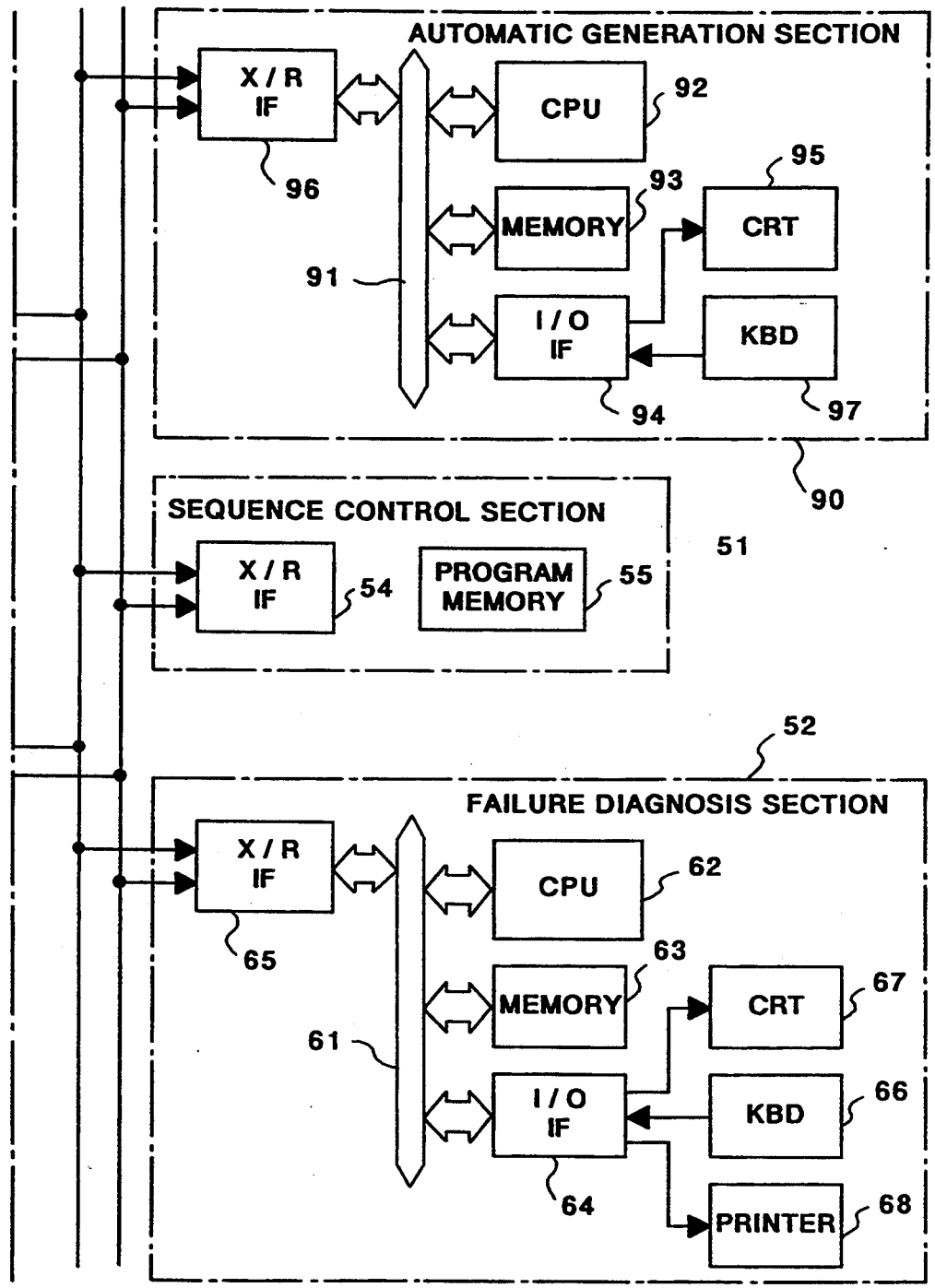
F I G. 16B

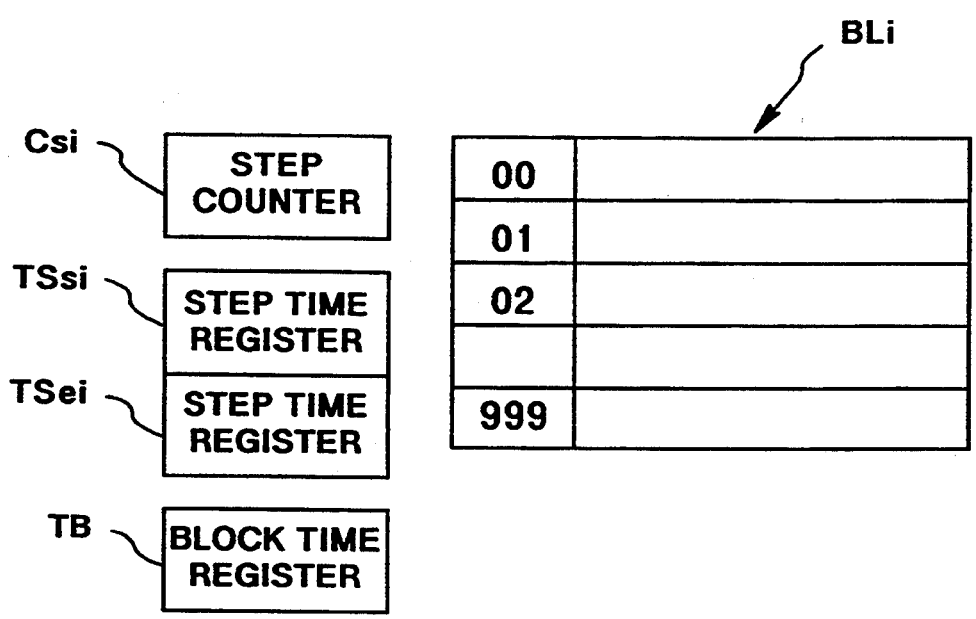
F I G. 18

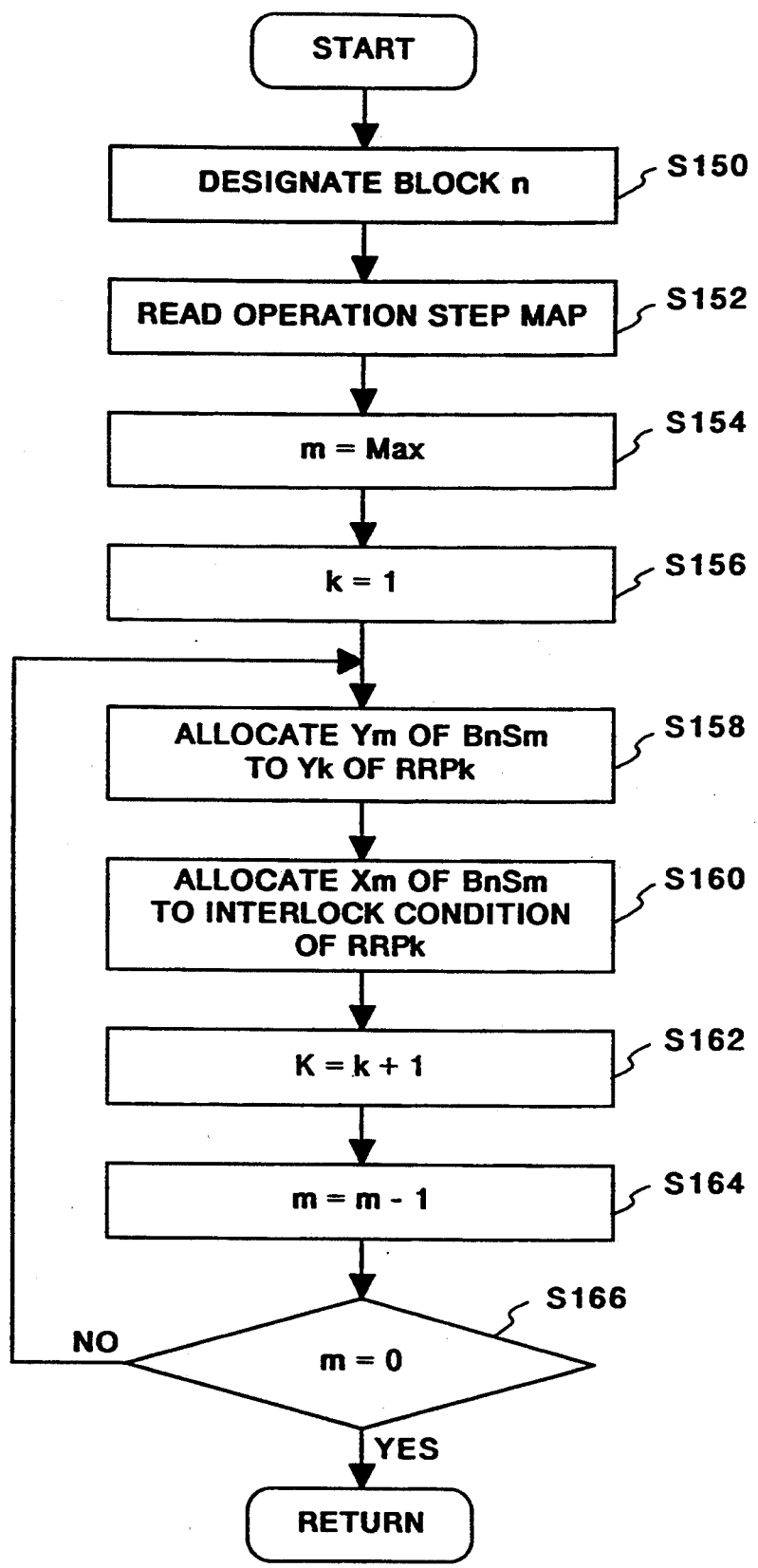
F I G. 21

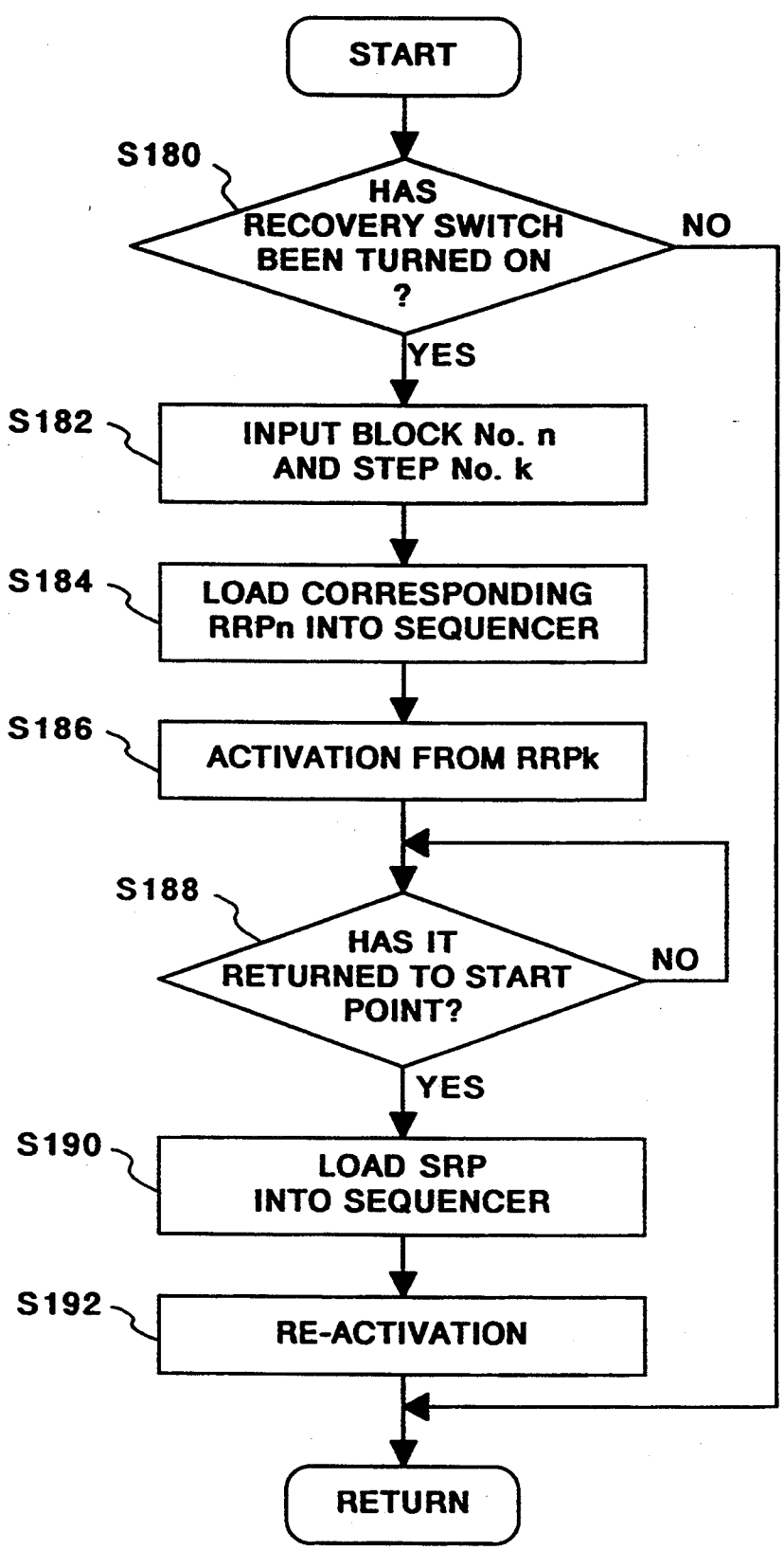
F I G. 22

OPERATION BLOCK MAP

|  | FROM | TO | SC | ESTIMATED TRANSITION TIME |
|---|---|---|---|---|
| BLOCK 1 | X | 2,3 |  | $\Gamma_{12}, \Gamma_{13}$ |
| BLOCK 2 | 1 | 4 |  | $\Gamma_{24}$ |
| BLOCK 3 | 1 | 4 |  | $\Gamma_{34}$ |
| BLOCK 4 | 2, 3 | X |  |  |

BLOCK 2

| No. | OUTPUT | CONFIRMATION |
|---|---|---|
| $B_2S_0$ | $Y_1$ | $X_1$ |
| $B_2S_1$ | $Y_2$ | $X_2$ |
| $B_2S_2$ | $Y_3$ | $X_3$ |
| $B_2S_3$ | $Y_4$ | $X_4$ |

F I G. 23C

BLOCK 3

| No. | OUTPUT | CONFIRMATION |
|---|---|---|
| $B_3S_0$ | $Y_5$ | $X_5$ |
| $B_3S_1$ | $Y_6$ | $X_6$ |
| $B_3S_2$ | $Y_7$ | $X_7$ |

F I G. 23D

ACTIVATING CONDITION MAP

| BLOCK 1 | |
|---|---|
| BLOCK 2 | |
| BLOCK 3 | |
| BLOCK 4 | $X_1<N>, X_2<N>, \text{--------} X_7<N>$ |

F I G. 23E

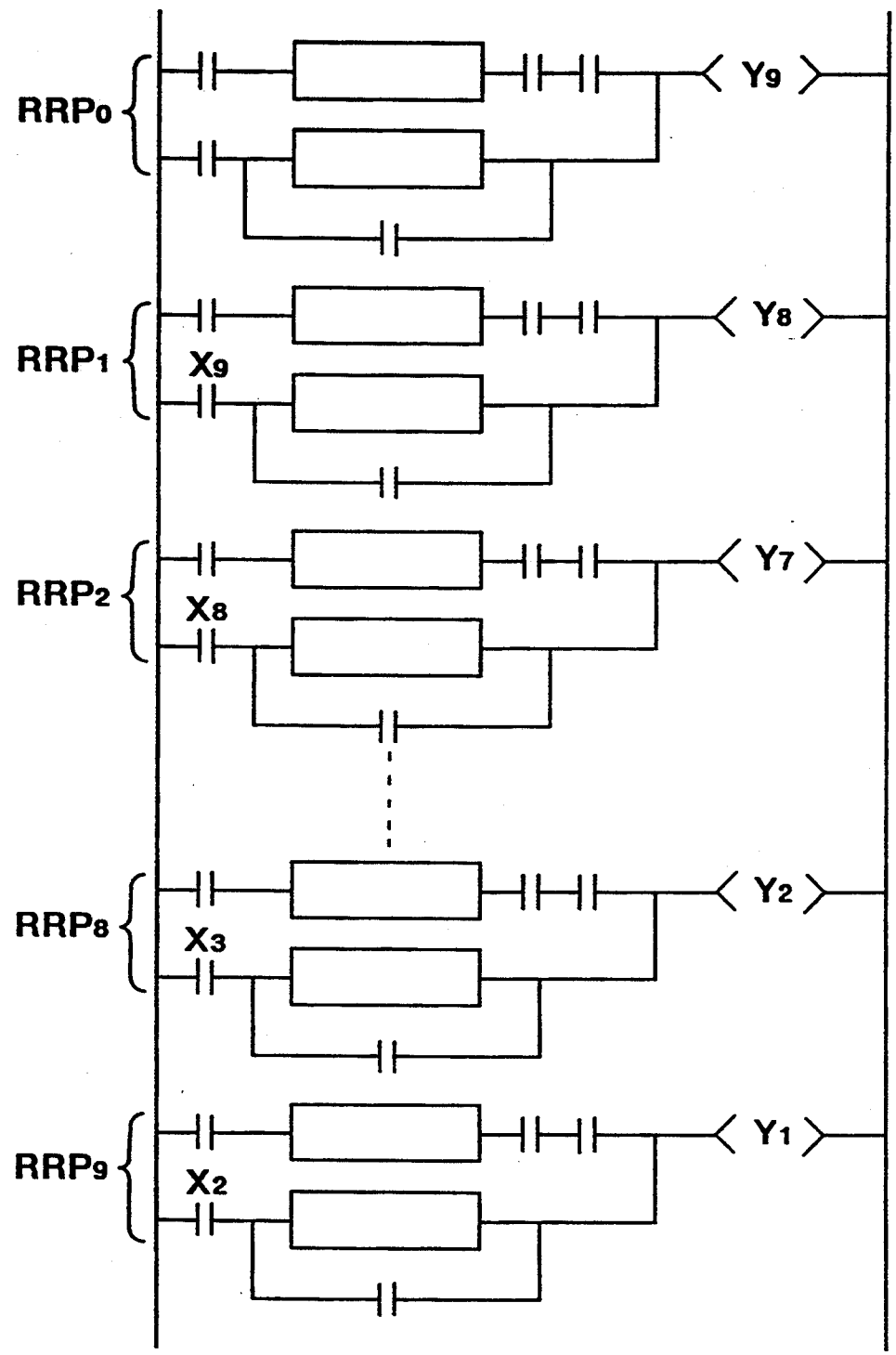
F I G. 26

DIAGNOSTIC METHOD FOR PRODUCTION LINE

This application is a continuation of application Ser. No. 07/753,610, filed Aug. 30, 1991, now abandoned.

BACKGROUND OF THE INVENTION

The present invention relates to a diagnostic method for a production line and, in particular, to an improvement in a method of locating a malfunctioning section in a production line controlled by a sequencer.

As is known, a production line, such as an assembly line for automobiles, may be equipped with a sequence control section having a built-in computer. By means of this sequence control section, sequence control is carried out over the operations to be sequentially performed by various items of equipment of the production line. In effecting such sequence control, the built-in computer of the sequence control section is loaded with control programs, in accordance with which the sequence control section successively carries out the different stages of operational control over the various items of equipment installed in the production line.

In many cases, such sequence control, performed over the operations of various items of equipment installed in a production line, is accompanied by failure diagnosis, which is carried out to monitor the control condition, detecting any failure in the equipment. Such diagnosis associated with sequence control may take a variety of forms. For example, Japanese Patent Laid-Open No. 60-238906 proposes a diagnostic method, according to which the modes of operation of the components of a sequence control circuit section when the associated equipment is operating in the normal manner are preset as reference modes of operation, and the modes of operation of the components of the sequence control section when the equipment is actually in operation are compared one by one with the reference modes of operation mentioned above, whereby any failure in the equipment is detected on the basis of any difference between these two categories of operation mode thus compared with each other.

However, the equipment of a production line is composed of a variety of components, which means the actual modes of operation of the equipment vary to a large degree, whereas the number of reference modes of operation for the equipment, with which the actual modes of operation for the equipment are to be compared, is limited. Thus, it may happen that the actual modes of operation of the components of the sequence control circuit section do not agree with the preset reference modes of operation, with the result that the equipment is erroneously judged to be out of order although it is really operating in the normal manner.

Further, when a failure has been detected in the equipment, it is necessary to locate the operation element thereof which has caused the failure. In locating an operation element which has caused a failure, it is necessary to check the mode of operation judged to be discordant with the corresponding reference mode of operation sequentially with a large number of operating elements of the equipment related to that mode of operation. Thus, in many cases, it is difficult to quickly locate the operation element which has caused the failure.

As described above, the method disclosed in Japanese Patent Laid-Open No. 60-238906 is effective for a failure which causes the equipment to stop its operation completely. However, for slight failures which are not so serious as to cause the equipment to stop completely, for example, failures attributable to secular change, which cause the equipment to take somewhat longer to operate than in the normal state, the above method is substantially incompetent since it is impossible to store all the patterns of such slight failures in memory as reference modes of operation.

The so-called "trap method" is a diagnostic method proposed as a means of detecting such slight failures. In the trap method, a supervisory ladder program is prepared, in accordance with which a timer is started upon output to an output device in a sequence-control ladder program, and it is checked whether or not a confirmation device for confirming the operation of the output device operates before the timer has run out.

The problem with the trap method described above is that a ladder program for trapping must be prepared for each of the individual ladder program elements, resulting in a very poor efficiency.

Furthermore, in an actual production line, the actuators may vary in terms, for example, of weight and operating speed. As a result, it may happen that an L/S switch gets into a logically impossible condition, as frequently experienced by the present inventors. That is, the actuator stops in a condition corresponding to neither "forward" nor "return" state, or gets into a condition corresponding to both "forward" and "return" state. This is partly due to a bounding of the actuator. Suppose, for example, the actuator has returned to the "return" state, with the LS for "return" detection operating to cause a "return" signal to be detected, upon which the sequence proceeds further. However, it often happens that the actuator bounds immediately after the sequence has thus proceeded further, the actuator slightly returning in the "forward" direction. Because of this slight returning, no "return" state detection signal is generated by the LS for detecting "return" movement of the actuator, with the result that the actuator gets into a condition which corresponds to neither "forward" nor "return" state.

Even when the switch has gotten into such a halfway condition, the sequence will proceed, until an operation step is reached where an operation is started upon checking the condition of that switch. However, the point at which the sequence thus stops is in all probability very far away from that operation step in which the failure has actually occurred, with the result that it is difficult to perform appropriate failure diagnosis.

SUMMARY OF THE INVENTION

It is accordingly an object of this invention to provide a diagnostic method for a production line which helps, when any failure has occurred, to quickly locate the operation step and operation element that are the cause of the failure.

To achieve the above object, the present invention provides a diagnostic method for a production line composed of a plurality of drive devices. In accordance with this invention, there is provided a diagnostic method for a production line in which the operation of one drive device is represented by one or a plurality of operation steps; in which the operation of the entire production line is represented by a plurality of operation blocks; in which each operation block includes one or a plurality of the above-mentioned operation steps; in which each operation step includes a confirming operation by a confirmation device for confirming the operation of the corresponding drive device; and in which each of the above-mentioned operation blocks operates independently of the other operation blocks from the start to end thereof; said method comprising the steps of:

a: storing previously in memory the correspondence between the drive devices and the confirmation devices in the above-mentioned operation steps;
   b: preparing and executing a sequence ladder program in which the following program elements are described in a form in which they are connected in parallel with each other: program elements describing the operations of the drive devices of the equipment of the production line concerned; program elements each adapted to measure the period between the time one of the drive devices starts operation and the time the drive device in the subsequent stage with respect to that drive device starts operation; and program elements each adapted to bring one of warning devices in an operating condition when a period thus measured is longer than a corresponding preset reference time;
   c: locating, when any one of the above-mentioned warning devices operates, the drive device corresponding to that warning device; and
   d: judging the drive device thus located in step c or the confirmation device associated with this drive device to be out of order.

In accordance with this diagnostic method, constructed as described above, warning devices respectively provided for each of different operation steps serve to indicate the occurrence of any failure in these operation steps. The correspondence between drive device and confirmation device in each operation step is previously stored in memory. Accordingly, it is possible to trace a drive device by virtue of the presence of a corresponding warning device and check whether or not the drive device is actually out of order by means of the corresponding confirmation device.

Another object of this invention is to provide a diagnostic method which makes it possible to perform failure detection and diagnosis without having to describe a timer monitoring program in the sequence ladder program.

To achieve the above object, the present invention provides a diagnostic method for a production line controlled in accordance with a ladder program prepared on the basis of a map on which the operations of equipment composed of a plurality of drive devices are described, the diagnostic method comprising the steps of:

a: previously storing on the above-mentioned map reference operation times which are required for the execution of the program elements of the above-mentioned ladder program and which respectively correspond to the operations of the individual drive devices;
   b: comparing the time it has actually taken a change to take place in the ON/OFF condition of each of the confirmation devices for confirming the operation of the corresponding drive device with the corresponding reference operation time; and
   c: locating, on the basis of the above comparison, any malfunctioning section of the production line.

In accordance with this diagnostic method, constructed as described above, the reference operation times can be stored in the form of maps, and any failure can be detected simply by comparing them with the actual operation times. In other words, no timer monitoring circuit or supervisor is needed on the ladder program side as in the prior art.

In a preferred form of this invention, the actual operation times and the reference operation times are stored in a single memory means. Each of the actual operation times is updated each time the ON/OFF condition of the corresponding confirmation device changes, and, at the same time, the actual operation time is compared with the corresponding reference operation time. With the actual operation times stored in memory, the timer program can be eliminated.

In a preferred form of the present invention, the reference operation times are modified in conformity with the actual operation times, so that a highly accurate diagnosis can be performed despite any secular change in the equipment.

In a preferred form of this invention, the map is an operation step map which includes the drive conditions for one of the drive devices, the conditions for confirming the operation of that drive device, the reference time, and the actual operation time. The operation step map is prepared on the basis of an input/output map describing the input/output conditions for the individual drive devices and of the operational sequence of the drive devices in the production line concerned. With this construction, the time data for failure detection can be unified.

Still another object of this invention is to provide a diagnostic method for a production line which makes it possible to perform failure diagnosis in a stage where the sequence has not advanced so far from the time the failure at which occurred.

To achieve this object, the present invention provides a diagnostic method for a production line which is composed of a plurality of drive devices; in which the operation of one drive device is represented by one or a plurality of operation steps; in which the operation of the entire production line is represented by a plurality of operation blocks; in which each operation block includes one or a plurality of the above-mentioned operation steps; in which each operation step includes a confirming operation by a confirmation device for confirming the operation of the corresponding drive device; and in which each of the operation blocks operates independently of the other operation blocks from the start to end thereof; said method comprising the steps of:

a: checking, when activating the ladder program of one operation block, the conditions of all the output confirmation devices in the operation steps of the operation blocks on the upstream side of and connected with that operation block; and
   b: determining that a failure has occurred when the condition of any one of these output confirmation devices is different from a predetermined corresponding condition.

With this diagnostic device, constructed as described above, an operation block can be activated only when the operations of the operation blocks on the upstream side thereof have been terminated in the normal manner. That is, an operation block is not activated when the normal termination of the operations of the operation blocks on the upstream side thereof has not been confirmed, whereby a delay in failure detection can be avoided.

In a preferred form of this invention, any malfunctioning section is located by checking, when the production line is at a stop, the conditions of the output confirmation devices in the operation steps of all the operation blocks which are on the upstream side of any non-activated operation block and which are connected therewith. In other words, by checking, when the production line is at a stop, the conditions of the output confirmation devices in the operation steps of all the operation blocks which are connected with and on the upstream side of any operation block that has not been activated, any malfunctioning section can be located.

In a preferred form of this invention, the period between the time the operations end in one operation block and the time the operation block on the downstream side thereof is activated, is monitored, whereby any operation block that has not been activated is located. By thus monitoring the time which elapses from the termination of the operations in one operation block to the activation of the operation block on the downstream side thereof, it is possible to locate any operation block that has not been activated.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is diagram showing an example of the supervisory ladder program in the first embodiment;

FIG. 4 is a flowchart illustrating the operation of locating a failure section in the first embodiment;

FIG. 10 is a diagram illustrating the configuration of an operation block map;

FIG. 11 is a diagram illustrating the configuration of the input/output map used in a second embodiment of the present invention;

FIG. 12 is a diagram illustrating the configuration of an operation map in the second embodiment;

FIGS. 14A through 14C are diagrams showing other examples of the step ladder pattern;

FIGS. 16A and 16B block diagrams illustrating the hardware configuration of the system of the second embodiment;

FIGS. 18 and 19 are diagrams illustrating the failure detection method in the second embodiment;

FIG. 21 is a flowchart showing the control program procedures for automatically generating a restoration ladder program in the second embodiment;

FIG. 22 is a flowchart showing the control program procedures for executing the automatically generated restoration ladder program of the second embodiment;

FIGS. 23A through 23E are diagrams illustrating the principle of block hang-up detection in the second embodiment;

FIG. 26 is a diagram showing an example of the recovery ladder program.

PREFERRED EMBODIMENTS OF THE INVENTION

Preferred embodiments of the present invention will now be described with reference to the accompanying drawings.

First, to be described will be the first embodiment of the present invention, in which a ladder program including a timer element is used. In the first embodiment, the principle of the present invention is realized in a concrete form. The principle of this invention is further developed in a concrete form in a second embodiment described below. In these embodiments, any failure in the production line is detected by comparing the time it has taken the equipment to operate with a reference time.

First Embodiment

Figure 1:
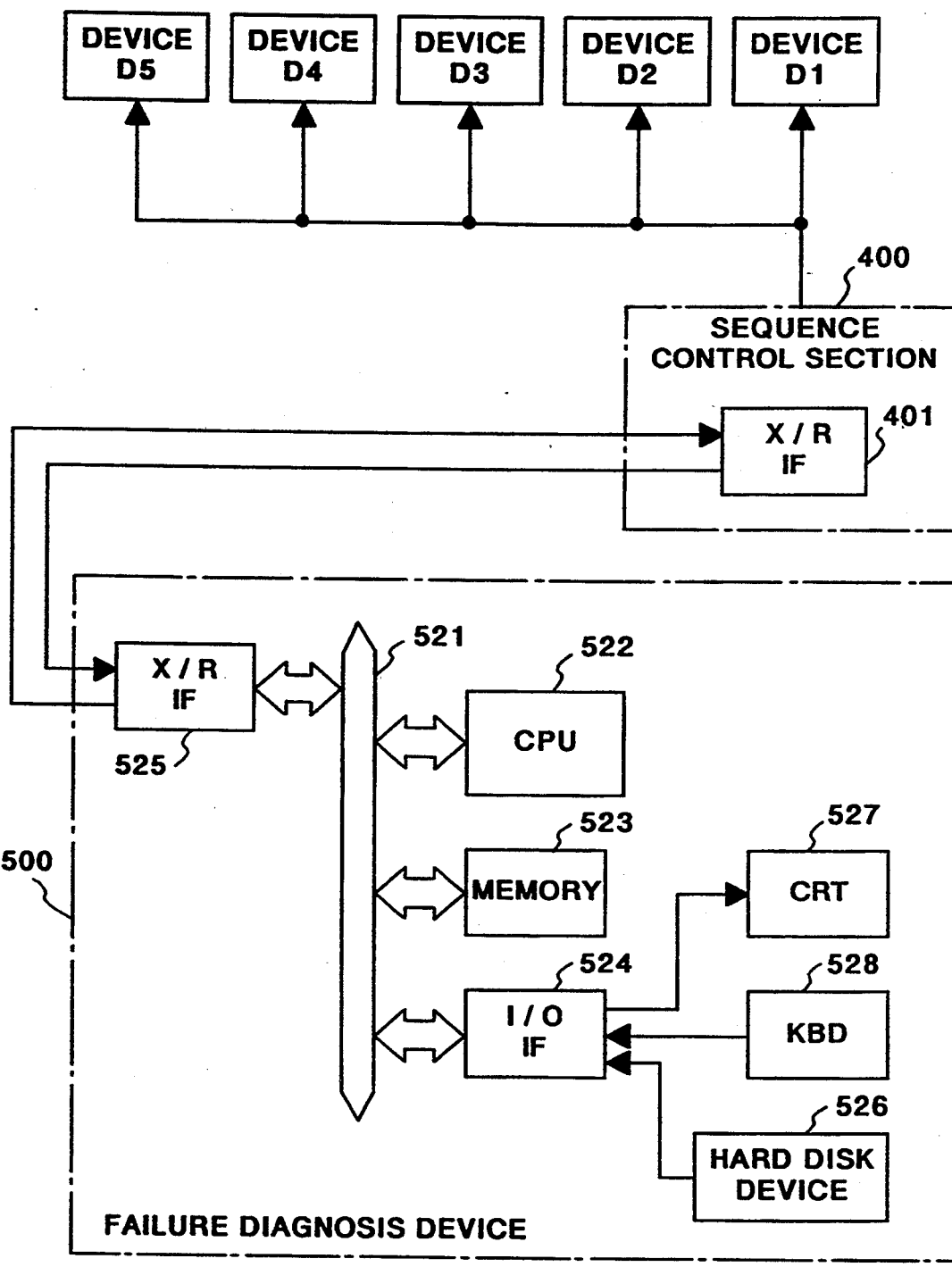
FIG. 1 is a block diagram illustrating the system configuration of a first embodiment of the present invention.

FIG. 1 is a block diagram of the entire system of the first embodiment. This system comprises: production line equipment 300 that is to be sequence-controlled; a sequence control section 400, which performs sequence control over the equipment 300; and a diagnosis control apparatus 500, which performs failure analysis for the equipment 300.

The equipment 300, which is to be sequence-controlled, consists of five devices: devices D1, D2, D3, D4 and D5, which are, as a whole, under the sequence control by the control section 400. The sequence control over the operations of the equipment 300 is effected in accordance with a sequence-control ladder program loaded into a built-in computer (not shown) of the sequence control section 400.

In an example of the failure analysis method for a production line of this invention, a sequence-control ladder program as shown in FIG. 2 is used. The program is loaded into the built-in computer of the sequence control section 400.

In FIG. 2, the operations to be performed by the equipment 300 are divided into a plurality of operation steps: $SP_1, SP_2, SP_3, \ldots, SP_n, \ldots$, which are executed sequentially. These operation steps respectively consist of three ladder operation element groups: $S_1, S_1', S_1''$; $S_2, S_2', S_2''$; $S_3, S_3', S_3''$; $\ldots$; $S_n, S_n', S_n''$. This also applies to the operation steps subsequent to the operation step $SP_n$.

Figure 3A:
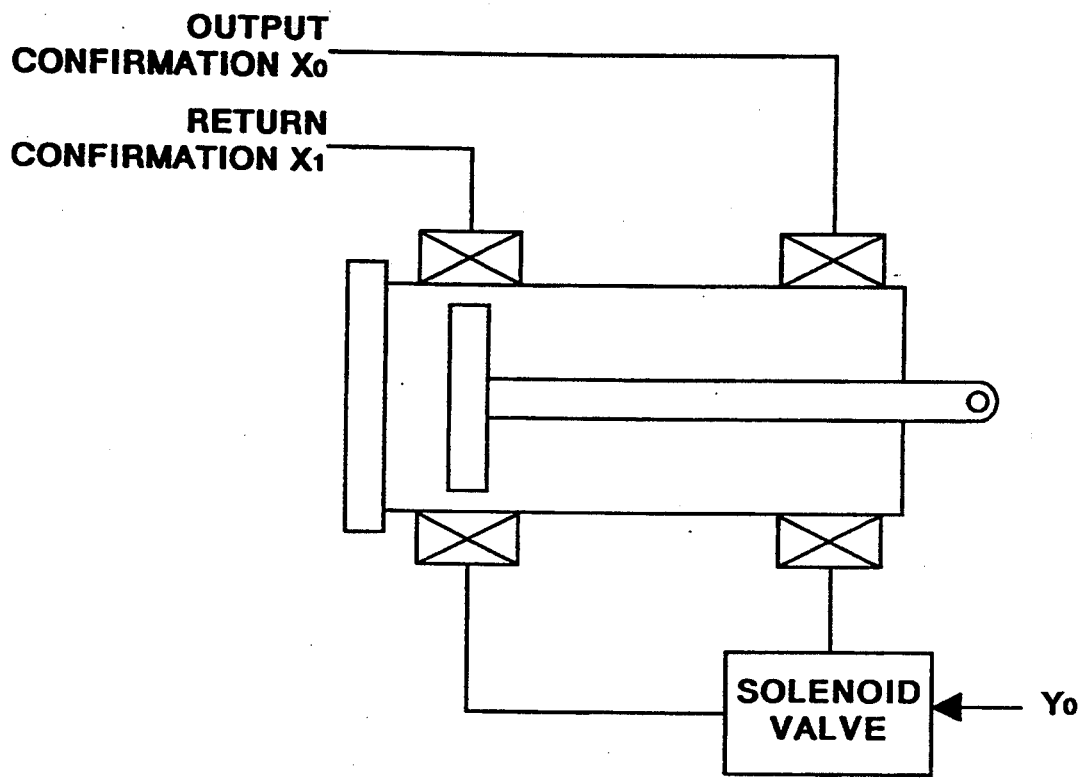
FIG. 3A is a schematic diagram showing the associated equipment as symbolized by an actuator.
Figure 3B:
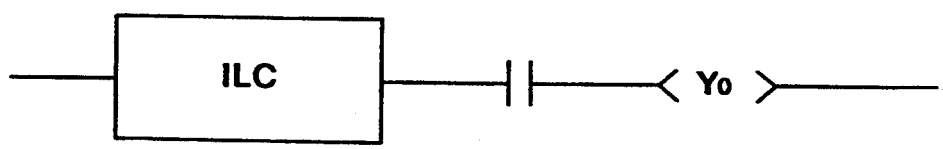
FIG. 3B is a schematic diagram showing the logic in the actuator shown in FIG. 3A.

Here, the symbols representing the operation elements shown in FIG. 2 will be explained. FIG. 3A shows a drive element of a general type, which is provided, for example, in device D1 of FIG. 1. Such a drive element includes a solenoid serving as the mechanical element thereof, which is driven by an input signal $Y_0$ supplied from a sequence ladder program element. Further, to enable the operating condition thereof to be checked, this drive element outputs a signal from a limit switch (a forward confirmation L/S) for confirming its being driven and a signal from a limit switch (a return confirmation L/S) for confirming its being returned to the original position. FIG. 3B is a diagram illustrating the logic in the output drive operation of the element of FIG. 3A. For the solenoid to be turned on, an interlock condition ILC must be satisfied. Generally, the interlock condition ILC includes various activating conditions peculiar to the operation step in question.

Referring to FIG. 2 again, the ladder operation element $S_1$ of the operation step $SP_1$ consists of an output operation element (Y1) which is to be brought to the operating condition in the operation step $SP_1$ and an interlock section ILC-1, which is connected in series thereto and in which the operation condition for $Y_1$ is set. The ladder operation element $S_2$ of the operation step $SP_2$ consists of an output operation element ($Y_2$) which is to be brought to the operating condition in the operation step $SP_2$ and an interlock section ILC-2, which is connected in series thereto and in which the operation condition for $Y_2$ is set. The ladder operation element $S_3$ of the operation step $SP_3$ consists of an output operation element ($Y_3$) which is to be brought to the operating condition in the operation step $SP_3$ and an interlock section ILC-3, which is connected in series thereto and in which the operation condition for $Y_3$ is set. The ladder operation element $S_n$ of the operation step $SP_n$ consists of an output operation element ($Y_n$) which is to be brought to the operating condition in the operation step $SP_n$ and an interlock section ILC-n, which is connected in series thereto and in which the operating condition for $Y_n$ is set. This is the same with the ladder operation element groups in those ladder formation sections corresponding to the operation steps subsequent to the operation step $SP_n$.

In the ladder operation element $S_1'$ of the operation step $SP_1$, the following components are connected in series to each other: a confirmation switch $Y_1$ for confirming the output operation element $Y_1$ having been brought to the operating condition, a switch $Y_2$ for confirming the output element $Y_2$ of the operation step $SP_2$ not being in the operating condition, and a timer element T1 representing the timer for measuring the period between the time the operation element $Y_1$ is brought to the operating condition and the time the operation element $Y_2$ is brought to the operating condition. In the ladder operation element $S_2'$ of the operation step $SP_2$, the following components are connected in series to each other: a confirmation switch $Y_2$ for confirming the output operation element $Y_2$ having been brought to the operating condition, a switch $Y_3$ for confirming the output element $Y_3$ of the operation step $SP_3$ not being in the operating condition, and a timer element T2 representing the timer for measuring the period between the time the operation element $Y_2$ is brought to the operating condition and the time the operation element $Y_3$ is brought to the operating condition. In the ladder operation element $S_3'$ of the operation step $SP_3$, the following components are connected in series to each other: a confirmation switch $Y_3$ for confirming the output operation element $Y_3$ having brought to the operating condition, a switch $Y_4$ for confirming the output element $Y_4$ of the operation step $SP_4$ not being in the operating condition, and a timer element T3 representing the timer for measuring the period between the time the operation element $Y_3$ is brought to the operating condition and the time the operation element $Y_4$ is brought to the operating condition. In the ladder operation element $S_n'$ of the operation step $SP_n$, the following components are connected in series to each other: a confirmation switch $Y_n$ for confirming the output operation element $Y_n$ having been brought to the operating condition, a switch $Y_{n+1}$ for confirming the output element $Y_{n+1}$ of the operation step $SP_{n+1}$ not being in the operating condition, and a timer element $T_n$ representing the timer for measuring the period between the operation element $Y_n$ is brought to the operating condition and the time the operation element $Y_{n+1}$ is brought to the operating condition.

Further, in the ladder operation element $S_1''$ of the operation step $SP_1$, a warning output operation element $M_1$ is connected in series to a timer interlock section TI-1 which prepares the condition for operating the warning output operation element $M_1$ when the measurement time $t_1$ as indicated by the timer element $T_1$ has exceeded a preset reference time $Q_1$ (that is, $t_1 > Q_1$). Likewise, in the ladder operation element $S_2''$ of the operation step $SP_2$, a warning output operation element $M_2$ is connected in series to a timer interlock section TI-2 which prepares the condition for operating the warning output operation element $M_2$ when the measurement time $t_2$ as indicated by the timer element $T_2$ has exceeded a preset reference time $Q_2$ (that is, $t_2 > Q_2$). In the ladder operation element $S_3''$ of the operation step $SP_3$, a warning output operation element $M_3$ is connected in series to a timer interlock section TI-3 which prepares the condition for operating the warning output operation element $M_3$ when the measurement time $t_3$ as indicated by the timer element $T_3$ has exceeded a preset reference time $Q_3$ (that is, $t_3 > Q_3$). This is the same with the operation elements of $SP_n$.

In FIG. 1, the diagnostic system includes a diagnosis control apparatus 500, which has a central processing unit (CPU) 522, a memory 523, an input/output interface (I/O interface) 524, and a transmission/reception interface 525, which are connected to each other through a bus line 521. The diagnosis control apparatus 500 is further equipped with a hard disk device 526 connected to the I/O interface 524 and serving as an auxiliary memory, a cathode ray tube (CRT) 527 for display, and a keyboard 528 for entering data and control codes. The transmission/reception interface 525 is connected to a transmission/reception interface 401 provided in the sequence control section 400.

In response to operations performed at the keyboard 428, the diagnosis control apparatus 500 receives data indicative of the progress in the sequence control over the equipment 300, from the sequence control section 400 through the transmission/reception interfaces 401 and 525. The CPU 522 detects the occurrence of any failure in the equipment 300 on the basis of the data supplied from the sequence control section 400 while performing the writing and reading of data to and from the memory 523. If the generation of any failure is detected, a display indicating the failure is given through the display CRT 527. The hard disk device 526 stores data on the ladder operation element groups in the sequence-control ladder program loaded into the built-in computer of the sequence control section 400, in such a manner that it can be read out individually, thus constructing a data base for failure diagnosis.

In this diagnosis control apparatus 500, the CPU 522 detects the occurrence of any failure in the equipment 300 that is to be sequence-controlled, in accordance with the diagnostic programs loaded into it and on the basis of the data from the sequence control section 400, locating, at the same time, the operating element which has caused the failure.

Prepared and stored in the hard disk device 526 is an operation step map, which provides the basic data for the sequence control ladder program shown in FIG. 2 and which includes data on the correspondence between the output operation elements Y, the warning output operation elements M, the timer elements T, the reference times, etc. of the operation steps $SP_1$, $SP_2$, $SP_3$, ..., $SP_n$, ... An example of this map is shown in the table below:

TABLE 1

| Operation Step | Output Element | Warning Element | Timer Element | Reference Time |
|---|---|---|---|---|
| $SP_1$ | $Y_1$ | $M_1$ | $T_1$ | $Q_1$ |
| $SP_2$ | $Y_2$ | $M_2$ | $T_2$ | $Q_2$ |
| $SP_3$ | $Y_3$ | $M_3$ | $T_3$ | $Q_3$ |
| . | . | . | . | . |
| . | . | . | . | . |
| . | . | . | . | . |
| $SP_n$ | $Y_n$ | $M_n$ | $T_n$ | $Q_n$ |
| . | . | . | . | . |
| . | . | . | . | . |
| . | . | . | . | . |

This operation map will be explained in more detail with reference to the second embodiment.

Next, the operation of detecting any failure and locating the operation element causing the failure, which is performed by the CPU 522 in the diagnosis control apparatus 500, will be described with reference to the flowchart of FIG. 4.

In step P1, the CPU 522 performs, with the equipment 300 being under the sequence control by the sequence control section 400, monitoring operation to see if any one of the warning operation elements $M_1$-$M_3$, ... $M_n$, ... in the ladder operation element groups $S_1''$-$S_3''$, ... $S_n''$, ... has been brought to the operating condition, while analyzing the condition data indicative of the sequence control over the equipment 300. If any one of the warning operation elements $M_1$-$M_3$, ... $M_n$, ..., for example, the warning operation element $M_x$, has been brought to the operating condition, the CPU 522 compares, in step P2, that warning operation element $M_x$ with the above-described operation step map read out from the hard disk device 526. Then, from the correspondence of the warning operation elements M as indicated in the operation step map, the CPU 522 locates the output operation element $Y_x$ corresponding to the warning operation element $M_x$.

The fact that the warning operation element $M_x$ has been brought to the operating condition implies that after the output operation element $Y_x$ has been brought to the operating condition, the measurement time $t_x$ of the timer element $T_x$ corresponding to the output operation element $Y_x$ has exceeded the reference time $Q_x$ before the output operation element subsequent to the output operation element $Y_x$, i.e., the output operation element $Y_{x+1}$, has been brought to the operating condition. Accordingly, there ought to have occurred in the equipment 300, which is to be sequence-controlled, a failure making it impossible for the output operation element $Y_{x+1}$ to be normally brought to the operating condition.

On the basis of the output operation element $Y_x$, located as the element corresponding to the warning operation element $M_x$, the CPU 522 locates the output operation element $Y_{x+1}$ subsequent to the output operation element $Y_x$, locating the ladder operation element group $S_{x+1}$ related to this output operation element $Y_{x+1}$ (Step P3).

Next, in step P4, the CPU 522 analyzes the interlock $ILC_{x+1}$ in the ladder operation element group $S_{x+1}$ located in step P3. Further, in step P5, that operation element in nonoperating condition preventing the output operation element $Y_{x+1}$ from being normally brought to the operating condition is located. On the basis of this operation element thus located, that operation element in the equipment 300 which has caused the failure is detected.

Thus, if a failure has occurred in the equipment 300 to be sequence-controlled, preventing an output operation element which is to be brought to the operating condition from being done so, the warning operation elements M included in the sequence control ladder program and the operation step map prepared beforehand are utilized to detect the failure and to analyze the operation element which has caused it. This makes it possible to quickly detect any operation element of the equipment 300 which has caused a failure.

Advantages of the First Embodiment

As is obvious from the above description, in accordance with the diagnostic method of the first embodiment, which is to be applied to a production line in which the operations to be performed are divided into a plurality of operation steps representing predetermined operation units and in which a plurality of operation steps are sequentially executed by a sequence control section in accordance with a sequence-control ladder program, the occurrence of any failure to prevent an output operation element from operating properly can be accurately detected on the basis of data which is supplied from the sequence control section and which is indicative of the condition in which the equipment is sequence-controlled, and, at the same time, the ladder operation element group which is to be analyzed to find out the cause of the failure can be located quickly and accurately, with the result that the operation element in the equipment which has caused the failure can be detected quickly and easily.

Modification of the First Embodiment

In the above-described example, each of the reference times $Q_1$–$Q_3$, ... $Q_n$, ... in the ladder operation element groups $S_1''$–$S_3''$, ... $S_n''$, ... of the ladder formation sections respectively corresponding to the operation steps $SP_1$–$SP_3$, ... $SP_n$, ..., is a preset constant value. However, to improve the accuracy in failure detection, it is also possible to arrange it such that each of the reference times $Q_1$–$Q_3$, ... $Q_n$, ... is corrected through learning. In that case, the correction is effected as follows: Suppose one of the reference times $Q_1$–$Q_3$, ... $Q_n$, ..., for example, $Q_x$, is to be corrected. Assuming that the initial set value is $Q_{xo}$ and the sample measurement value as indicated by the timer $T_x$ when there is no failure is $t_{xm}$ (m: a positive integer), the reference time $Q_x$ corresponding to the y-th timer measurement can be expressed by the following equation:

$$Q_x = \frac{Q_{xo} + \sum_{m=1}^{y-1} t_{xm}}{y}$$

The above equation implies that $Q_x$ is expressed as the average value of the sum of the initial set value $Q_{xo}$ and the sum total of the measurement times from the first to the (y−1)th measurement as obtained by the timer. By thus correcting the reference times through learning, each of the reference times $Q_1$–$Q_3$, ... $Q_n$, ... becomes a value adapted to the actual operating condition of the equipment, and the failure detection by the timer elements $T_1$–$T_3$, ... $T_n$, ... can be effected more accurately.

Second Embodiment

The second embodiment of the present invention, which is applied to sequence-control/diagnosis for an automobile production line, will be described with reference to the accompanying drawings.

Figure 5:
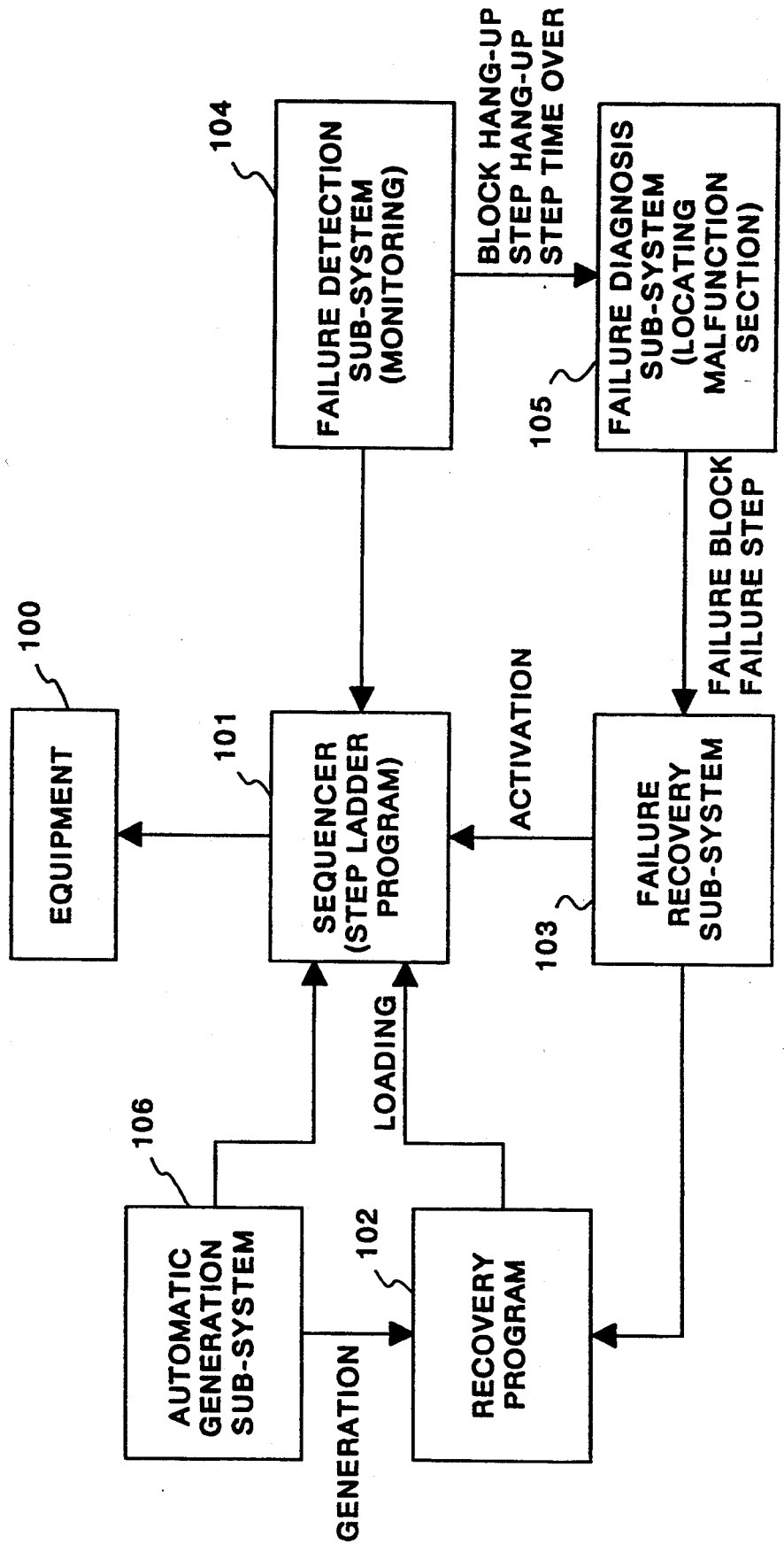
FIG. 5 is a block diagram showing the functions of the first embodiment.

As shown in FIG. 5, the system of the second embodiment includes a sub-system 106 for automatically generating a ladder program for sequence control and a recovery program, a sub-system 101 for executing the ladder program thus generated, a sub-system 104 for detecting any failure, a sub-system system 105 for locating any malfunctioning section on the basis of a failure detected, and a recovery sub-system 103 for recovering the system.

FIG. 5 is a conceptual diagram illustrating the system of the second embodiment. The step ladder program 101 is a program which is loaded into a sequencer or the like so as to control the equipment 100, and is generated by the automatic generation sub-system 106. The execution of this program 101 is monitored by the supervisory sub-system 104, whereby any failure in the equipment 100 is detected. In the failure detection sub-system 104 of the second embodiment, three types of failure: "block hang-up", "step time over" and "step hang-up", are detected. The procedures for detecting these failures will be described below with reference to the accompanying drawings. The "block hang-up" is a hang-up which occurs during transition from one operation block (The concept of "operation block" will be explained below with reference to FIG. 10) to another subsequent thereto, and which it has been impossible to detect with prior-art techniques. On the other hand, when, in an operation step (The concept of "operation step" will be explained below with reference to FIG. 12), an elapsed time has been longer than an estimated time or a hang-up has occurred, it is determined that a "step time over" or a "step hang-up" failure has occurred To detect these "block hang-up", "step time over" and "step hang-up" failures, the failure detection sub-system 104 includes such components as a "block timer counter", a "step timer counter" etc as described below The failure diagnosis sub-system 105 further analyzes any failure by means of the monitor system 104, thereby locating the malfunctioning section (the operation step where the failure has occurred). The procedures for performing this failure diagnosis will also be described below with reference to the accompanying drawings. The recovery sub-system system 103 is adapted to activate the recovery program 102 that is most suitable for the operation step located by the diagnosis sub-system 105, thereby recovering the system. This recovery program 102 is prepared by the automatic generation sub-system 106, on the basis of an "operation block map", an "operation step map", etc., which will be described below. It will be understood, from the explanation below of the automatic generation of the recovery sub-system and the recovery program, that the present system helps to realize an automatic recovery-program generation and an accurate automatic recovery.

First, a vehicle assembly line, which constitutes the object of the sequence control by the sequence control program 101, will be described. Then, the automatic generation sub-system 106 for generating the sequence control program will be described, and, in the course of the description, the operation block and the operation step, concepts significant in the failure diagnosis of the second embodiment, will be explained. Afterwards, a description will be given of a failure-detection/diagnosis/recovery system, which constitutes a feature of the second embodiment.

Assembly Line

An example of a vehicle assembly line to be controlled by the sequential control program in accordance with the embodiment will be described below with reference to FIGS. 6 and 7.

Figure 6:
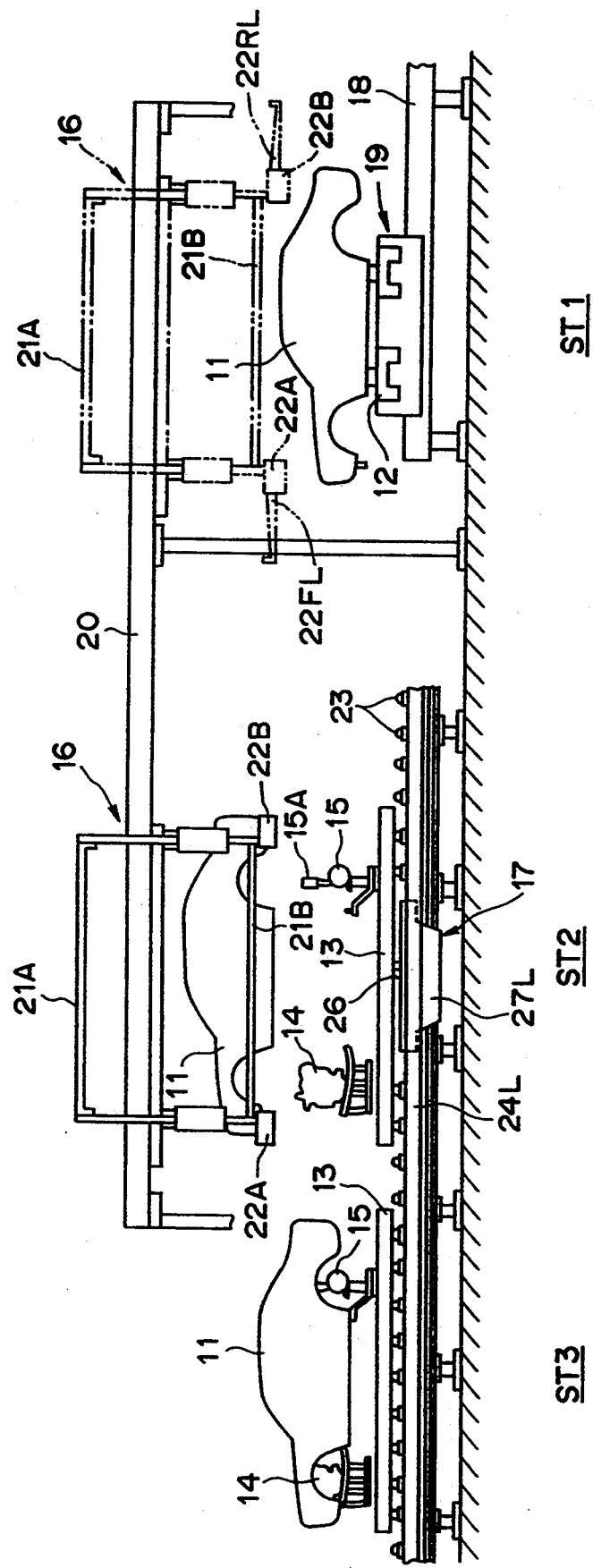
FIGS. 6 through 8 are diagrams showing the construction of an assembly line for automobiles to which the present invention (the first embodiment) is applied.
Figure 7:
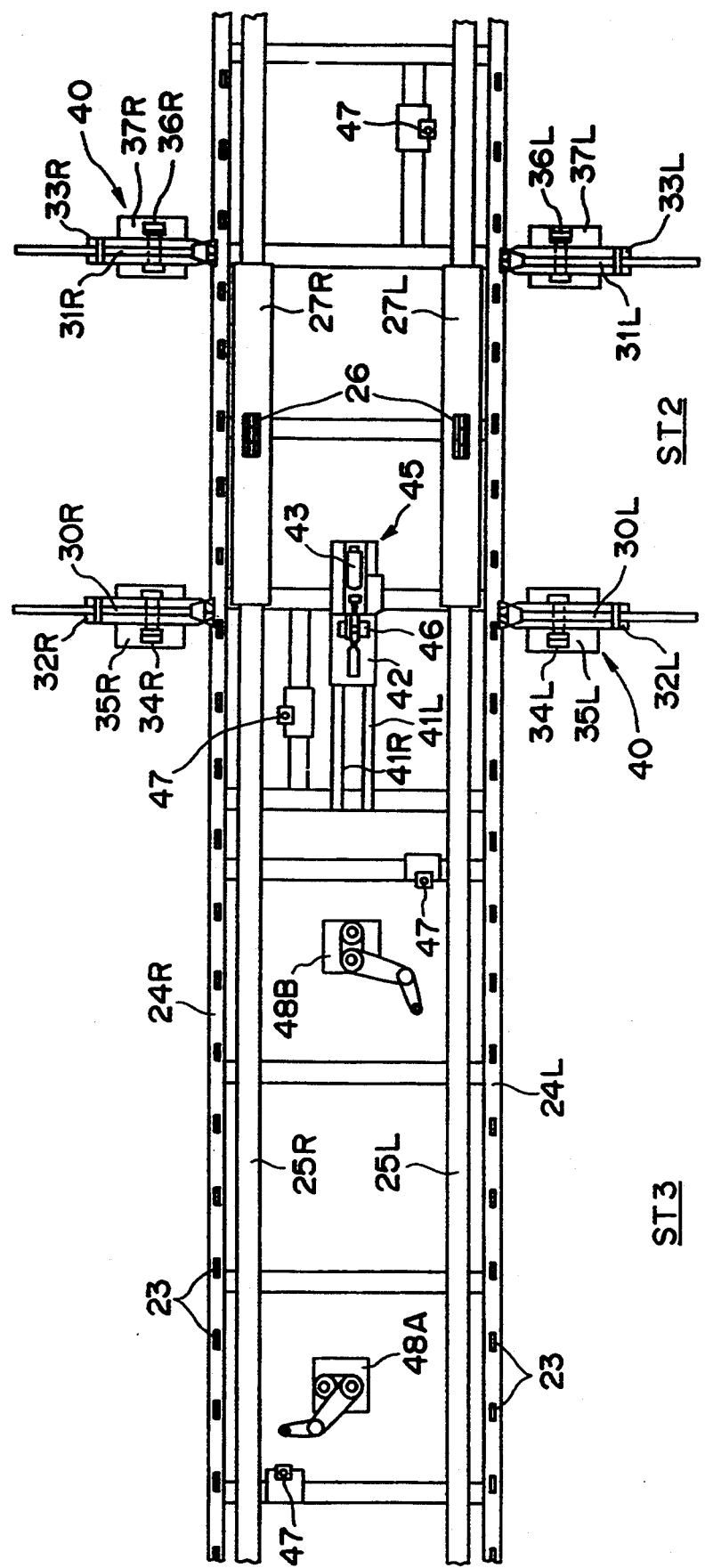

The vehicle assembly line shown in FIGS. 6 and 7 consists of, for example, three stations: a positioning station ST1, a docking station ST2, and a screwing station ST3. At the positioning station ST1, a body 11 of a vehicle is placed on a receiving stand 12 and is positioned thereon by the positioning control of the receiving stand 12. At the docking station ST2, an engine 14, a front suspension assembly (not shown) and a rear suspension assembly 15 placed in predetermined positions on a pallet 13 are set in combination with the body 11. At the screwing station ST3, the engine 14, the front suspension assembly and the rear suspension assembly 15 set at the station ST2 are fixed to the body 11 by screwing with screws. An overhead type transfer device 16 for holding and transporting the body 11 is provided between the positioning station ST1 and the docking station ST2. A pallet carrier 17 for transporting the pallet 13 is provided between the docking station ST2 and the screwing station ST3.

The receiving stand 12 in the positioning station ST1 is reciprocatively moved along a rail 18. In the positioning station ST1 are provided a positioning means (denoted as BF) for positioning the body 11 placed on the receiving stand 12 with respect to a front portion of the body 11 in the widthwise direction of the vehicle by moving the receiving stand 12 in a direction perpendicular to the rail 18 (in the widthwise direction of the vehicle), another positioning means (BR) for positioning a rear portion of the body 11 in the widthwise direction of the vehicle, and a further positioning means (TL) for positioning the body 11 in the direction of the front or rear of the body 11 by moving the receiving stand along the rail 18 (in the direction of the front or rear end of the body 11). At the station ST1 are further provided lifting reference pins (FL, FR, RL, and RR) which are used to position the body 11 relative to the receiving stand 12 by being brought into engagement with left and right front portions and left and right rear portions of the body 11. These positioning means and the lifting reference pins constitute a positioning unit 19 in the positioning station ST1. That is, the positioning means and the lifting reference pins are objects of control based on the sequential control program with respect to the positioning unit 19.

Figure 8:
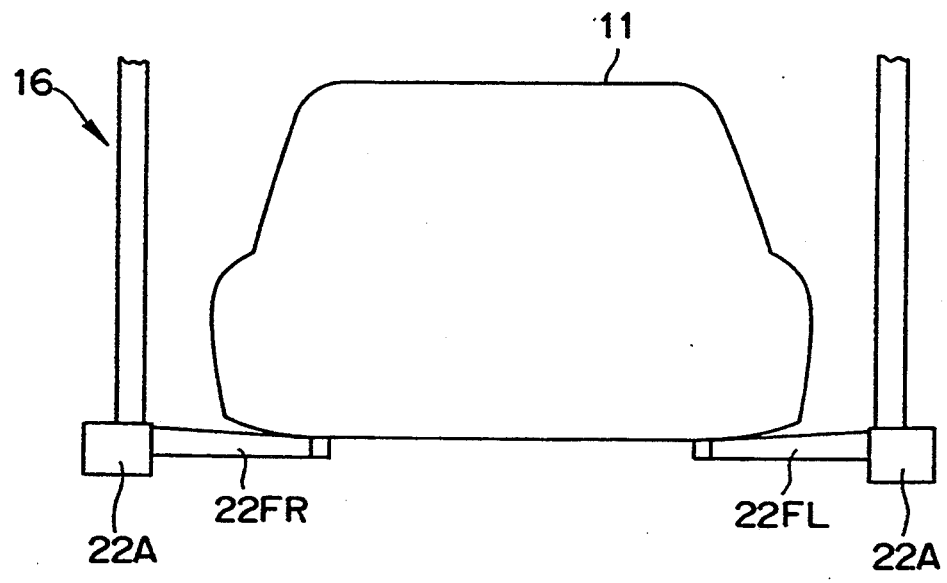

The transfer device 16 has a guide rail 20 extending over the positioning station ST1 and the docking station ST2, and a carrier 21 capable of moving along the guide rail 20. A lifting hanger frame 21B is attached to the carrier 21, and the body 11 is supported by the lifting hanger frame 22. As shown in FIG. 8, a left fore support arm 22FL and a right fore support arm 22FR are attached to the lifting hanger frame 22 through a pair of fore arm clamps 22A, and a left rear support arm 22RL and a right rear support arm 22RR (not shown) are also attached to the lifting hanger frame 22 through a pair of rear arm clamps 22B.

Each of the left fore support arm 22FL and the right fore support arm 22FR is rotated on the corresponding fore arm clamp 22A and is positioned such as to extend along the guide rail 20 when released from the state of being clamped by the fore arm clamp 22A, or is positioned such as to extend in a direction perpendicular to the guide rail 20 when clamped by the fore arm clamp 22A, as shown in FIG. 8. Similarly, each of the left rear support arm 22RL and the right rear support arm 22RR is rotated on the corresponding rear arm clamp 22B and is positioned such as to extend along the guide rail 20 when released from the state of being clamped by the rear arm clamp 22B, or is positioned such as to extend in a direction perpendicular to the guide rail 20 when clamped by the rear arm clamp 22B.

To load the transfer device 16 with the body 11, the transfer device 16 is moved to a position (starting position) indicated by a dot-dash line shown in FIG. 6, at which its front end is located right above the front end of the rail 18, and the left fore support arm 22FL and the right fore support arm 22FR are released from the state of being clamped by the clamps 22A to extend along the guide rail 20. The lifting hanger frame 21B is thereafter moved downward. In this state, the receiving stand 12 on which the body 11 is placed is moved along the rail 18 the front end of the rail 18 to be set in a position corresponding to that of the lifting hanger frame 21B of the transfer device 16 which has been moved downward. The left fore support arm 22FL and the right fore support arm 22FR are respectively rotated to the position extending in the direction perpendicular to the guide rail 20 below the front portion of the body 11, and are clamped by the front arm clamps 22A. Also, the right rear support arm 22RR and the left rear support arm 22RL are respectively rotated to the position extending in the direction perpendicular to the guide rail 20 below the rear portion of the body 11, and are clamped by the rear arm clamps 22B. Thereafter, the lifting hanger frame 21B is moved upward and the body 11 is supported by the left fore support arm 22FL, the right fore support arm 22FR, the left rear support arm 22RL and the right rear support arm 22RR attached to the lifting hanger frame 21B of the transfer device 16, as shown in FIG. 8.

The pallet carrier 17 has a pair of guide members 24L and 24R on which a multiplicity of support rollers 23 for supporting the lower surface of the pallet 13 are mounted, a pair of transport rails 25L and 25R extending parallel to the guide members 24L and 24R, pallet transport bases 27L and 27R having pallet engagement portions 26 for engagement with the pallet 13 and movable along the transport rails 25L and 25R, and a linear motor mechanism (not shown) for driving the pallet transport bases 27L and 27R.

In the docking station ST2 are provided a pair of left and right fore clamp arms 30L and 30R and a pair of left and right rear clamp arms 31L and 31R which respectively support struts of the front suspension assembly and struts 15A of the rear suspension assembly 15 to set the same in assembled positions at the time of fitting of the front suspension assembly and the rear suspension assembly 15. The left and right fore clamp arms 30L and 30R are respectively attached to attachment plate members 32L and 32R so that they can advance or retreat in a direction perpendicular to the transport rails 25L and 25R, while the left and right rear clamp arms 31L and 31R are respectively attached to attachment plate members 33L and 33R so that they can also advance or retreat in a direction perpendicular to the transport rails 25L and 25R. The left and right fore clamp arms 30L and 30R and the left and right rear clamp arms 31L and 31R have, at their respective opposite extreme ends, engagement portions engageable with the struts of the front suspension assembly and the rear suspension assembly 15. An arm slide 34L enables the attachment plate member 32L to move relative to a fixed base 35L in a direction parallel to the transport rails 25L and 25R. An arm slide 34R enables the attachment plate member 32R to move relative to a fixed base 35R in a direction parallel to the transport rails 25L and 25R. An arm slide 36L enables the attachment plate member 33L to move relative to a fixed base 37L in a direction parallel to the transport rails 25L and 25R. Further, an arm slide 36R enables the attachment plate member 33R to move relative to a fixed base 37R in a direction parallel to the transport rails 25L and 25R. Consequently, the left and right fore clamp arms 30L and 30R are movable in each of the longitudinal and widthwise directions of the carrier 17 while their extreme end portions are in engagement with the struts of the front suspension assembly. Also, the left and right rear clamp arms 31L and 31R are movable in each of the longitudinal and widthwise directions of the carrier 17 while their extreme end portions are in engagement with the struts 15A of the rear suspension assembly 15. The left and right fore clamp arms 30L and 30R, the arm slides 34L and 34R, the left and right rear clamp arms 31L and 31R, and the arm slides 36L and 36R constitute docking devices 40.

In the docking station ST2 are further provided a pair of slide rails 41L and 41R extending parallel to the transport rails 25L and 25R, and a slide device 45 including a movable member 42 slidable along the slide rails 41L and 41R and a motor 43 for driving the movable member 42. On the movable member 42 of the slide device 45 are provided an engagement means 46 for engagement with a movable engine support member (not shown) provided on the pallet 13, and a pair of lifting pallet reference pins 47 for setting the pallet in a predetermined position. When the engine 14, the front suspension assembly and the rear suspension assembly 15 placed on the pallet 13 are set in combination with the body 11 supported by the lifting hanger frame 22 of the transfer device 16, the engagement means 46 of the slide device 45 is moved along the rails 41L and 41R while engaging with the movable engine support member positioned by the lifting pallet reference pins 47 on the pallet 13 to move the engine 14 relative to the body 11 in the same direction, thereby avoiding interference between the body 11 and the engine 14.

In the screwing station ST3 are disposed a robot 48A for screwing operation of fixing to the body 11 the engine 14 and the front suspension assembly set in combination with the body 11, and another robot 48B for screwing operation of fixing to the body 11 the rear suspension assembly 15 set in combination with the body 11. A pair of lifting pallet reference pins 47 for setting the pallet 13 in a predetermined position are also provided in the screwing station ST3.

In the vehicle assembly line described with reference to FIGS. 6 to 8 the positioning unit 19 and the transfer device in the positioning station ST1, the docking devices 40, the slide device 45 and the pallet transport unit 17 in the docking station ST2, and the robots 48A and 48B in the fastening station ST3 are controlled in a sequential manner based on a sequential control program formed by a program composition apparatus in accordance with this embodiment, That is, the positioning unit 19, the transfer device and so on are "equipment units" which are the objects of the sequential control.

Automatic Generation of Sequential Program

The assembling operation of the production line shown in FIG. 6, i.e., the operations effected by all the equipment units which are the objects of sequential control can be separated into a plurality of "operation blocks". Each operation block is defined as described below.

(1): An operation block is a set of a plurality of unit operations. One of the most important properties of an operation block resides in that (2): the operation of each operation block can be completed independently of other operation blocks without any interference of the same during the intermediate process between the start and the end of the operation block.

Because of the properties (1) and (2), each operation block can be described as a block (batch). In other words, each operation block relates to other operation blocks only at operation block level. To start the operation of one operation block, the termination of the operation of at least one other operation block is required. That is, the termination of the operation of one operation block is used as the condition for starting another operation block (or a plurality of operation blocks) connected to it, or the termination of the operation of a plurality of operation blocks is used as the condition for starting another operation block.

According to the above-mentioned properties, no intermediate stage of the operation of one operation block, initiates other blocks. Also, at any intermediate step of one operation block, no start-up from other blocks is waited.

The following incidental property (3) of the operation block can be induced from the definition of the operation block shown in (1) and (2).

(3) Preferably, each operation block is the greatest of possible sets of unit operations having the properties (1) and (2).

The property (3) is not absolutely necessary. However, if the condition (3) is satisfied, the number of blocks with which the production line is described is reduced and the description of the whole process is simplified and is easy to read.

The production line shown in FIGS. 6 and 7 is described with operation blocks satisfying the conditions (1) to (3), thereby obtaining 17 operation blocks A0 to A4 and B0 to B11 described below.

Of these 17 operation blocks, 12 operation blocks B0 to B11 are shown below.

Block B0: an operation block for positioning the receiving stand 12 and the body 11 on the receiving stand 12 with the positioning unit 19. This operation block is called a receiving stand positioning block.

Block B1: an operation block of preparing the transfer device 16 to carry the body 11. This operation block is called a transfer device preparation block.

Block B2: an operation block of preparing the docking devices 40 to clamp the struts of the front suspension assembly by the left and right fore clamp arms 30L and 30R and to clamp the struts 15A of the rear suspension assembly 15 by the left and right rear clamp arms 31L and 31R. This operation block is called a strut clamping preparation block.

Block B3: an operation block of moving the body 11 positioned on the receiving stand 12 by the positioning unit 19 to the lifting hanger frame 22 of the transfer device 16. This operation block is called a transfer device reception block.

Block B4: an operation block of preparing the slide device 45 to engage the engagement means 46 provided on the movable member 42 with the movable engine support member on the pallet 13. This operation block is called a slide device preparation block.

Block B5: an operation block of returning the receiving stand 12 to the starting position with the positioning unit 19. This operation block is called a receiving stand returning block.

Block B6: an operation block of combining the engine 14 disposed on the pallet 13, the struts of the front suspension assembly disposed on the pallet 13 and clamped by the left and right fore clamp arms 30L and 30R and the struts 15A of the rear suspension assembly 15 clamped by the left and right rear clamp arms 31L and 31R with the body 11 supported by the lifting hanger frame 22 of the transfer device 16. This operation block is called an engine/suspension docking block.

Block B7: an operation block of returning the transfer device 16 to the starting position. This operation block is called a transfer device returning block.

Block B8: an operation block of making the docking devices 40 return the left and right fore clamp arms 30L and 30R and the left and right rear clamp arms 31L and 31R to the respective starting positions. This operation block is called a clamp arm returning block.

Block B9: an operation block of making the pallet carrier 17 operate the linear motor to transport the pallet 13 on which the body 11 in combination with the engine 14, the front suspension assembly and the rear suspension assembly 15 is placed to the screwing station ST3. This operation block is called a linear motor driving block.

Block B10: an operation block of performing screwing operation with the robot 48A to fix to the body 11 the engine 14 and the front suspension assembly set in combination with the body 11. This operation block is called a first screwing operation block.

Block B11: an operation block of performing screwing operation with the robot 48B to fix to the body 11 the rear suspension assembly 15 set in combination with the body 11. This operation block is called a second screwing operation block.

Figure 9:
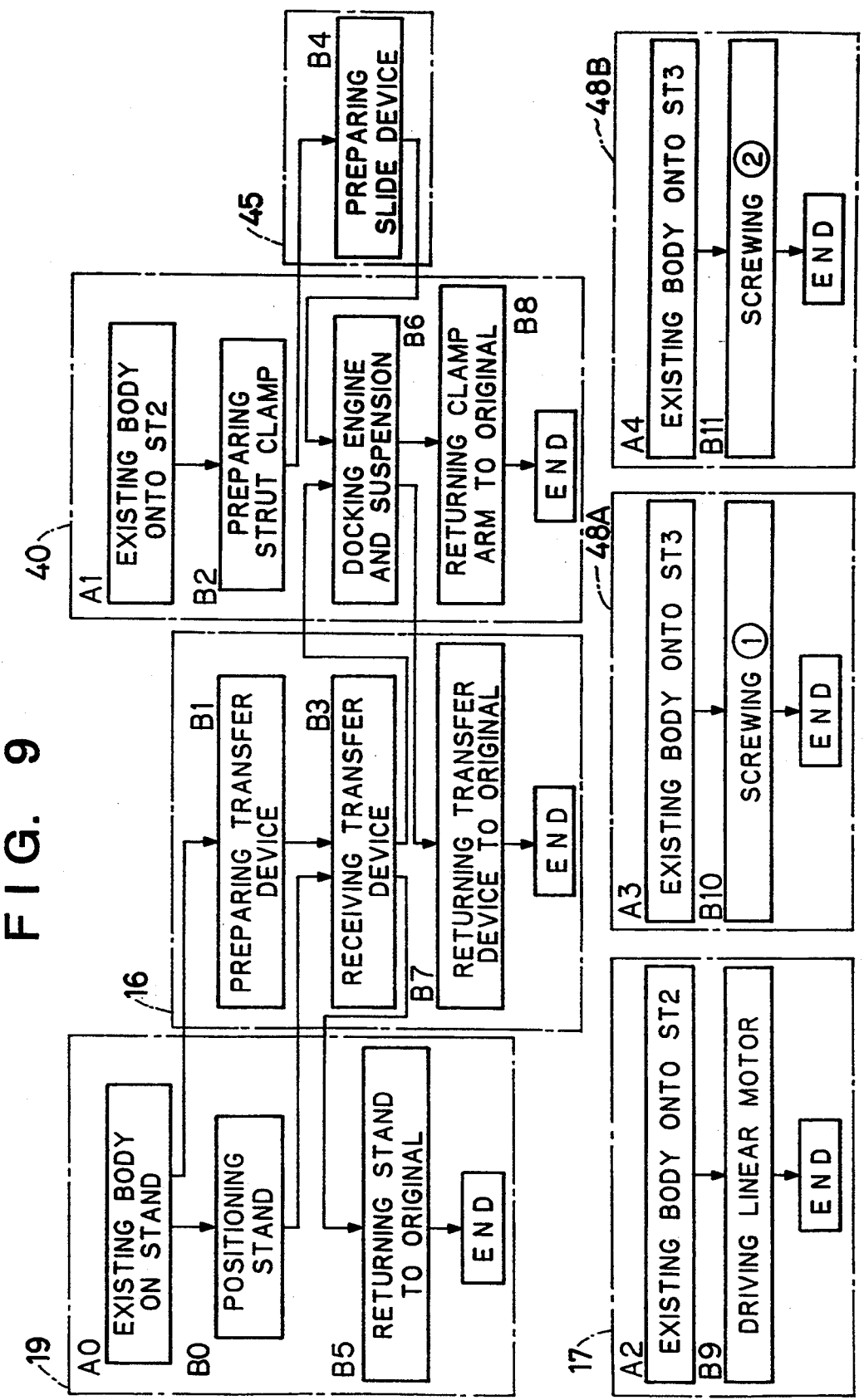
FIG. 9 a diagram showing the above assembly line as divided into operation blocks, illustrating how these operation blocks connected with each other.

FIG. 9 shows the relationship between the seventeen operation blocks A0 to A4 and B0 to B11 of the production line shown in FIGS. 9 to 11. The diagram of FIG. 9 is made by the programmer based on the analysis of the production line shown in FIGS. 6 to 8 in order to compose the sequential control program for this production line.

In FIG. 9, two lines are drawn to the block B3 relating to the transfer device 16 from the operation block B0 relating to the positioning unit 19 and the operation block B1 relating to the transfer device 16. These lines denote that the block B3 is started provided that the positioning operation (operation block B0) of the positioning unit 19 for positioning the receiving stand 12 and the body 11 placed on the receiving stand 12 is completed and that the preparation (operation block B1) for carrying the body 11 by the transfer device 16 is completed. In other words, the operations of the operation blocks B0 and B1 are performed in parallel with each other.

Each of the above-described operation blocks B0 to B11 is divided into a plurality of operation steps each including an output operation. The provision of an output operation is a necessary condition for each operation step. However, since the operation steps are constituents of one operation block, each operation step in one operation block supplies no output to the operation steps of other operation blocks.

For example, the receiving stand positioning operation block B0 is divided into the following 10 operation steps B0S0 to B0S9.

B0S0: an operation step of confirming various conditions for starting the operation block B0 (called condition confirmation operation step).

B0S1: an operation step of moving the receiving stand 12 by the positioning means BF to position the front portion of the body 11 in the widthwise direction of the vehicle (BF positioning operation step).

B0S2: an operation step of moving the receiving stand 12 by the positioning means BR to position the rear portion of the body 11 in the widthwise direction of the vehicle (BR positioning operation step).

B0S3: an operation step of moving the receiving stand 12 by the positioning means TL to position the body 11 in the direction parallel to the rail 18 (TL positioning operation step).

B0S4: an operation step of bringing the lifting reference pin FR into engagement with a fore right side portion of the body 11 (FR engagement operation step).

B0S5: an operation step of bringing the lifting reference pin FL into engagement with a fore left side portion of the body 11 (FL engagement operation step).

B0S6: an operation step of bringing the lifting reference pin RR into engagement with a rear right side portion of the body 11 (RR engagement operation step).

B0S7: an operation step of bringing the lifting reference pin RL into engagement with a rear left side portion of the body 11 (RL engagement operation step).

B0S8: an operation step of returning the positioning means BF to the starting position after positioning the front portion of the body 11 in the widthwise direction of the vehicle (BF returning step).

B0S9: an operation step of returning the positioning means BR to the starting position after positioning the rear portion of the body 11 in the widthwise direction of the vehicle (BR returning step).

FIG. 12 shows examples of operation steps of the production line shown in FIG. 6.

Figure 13:
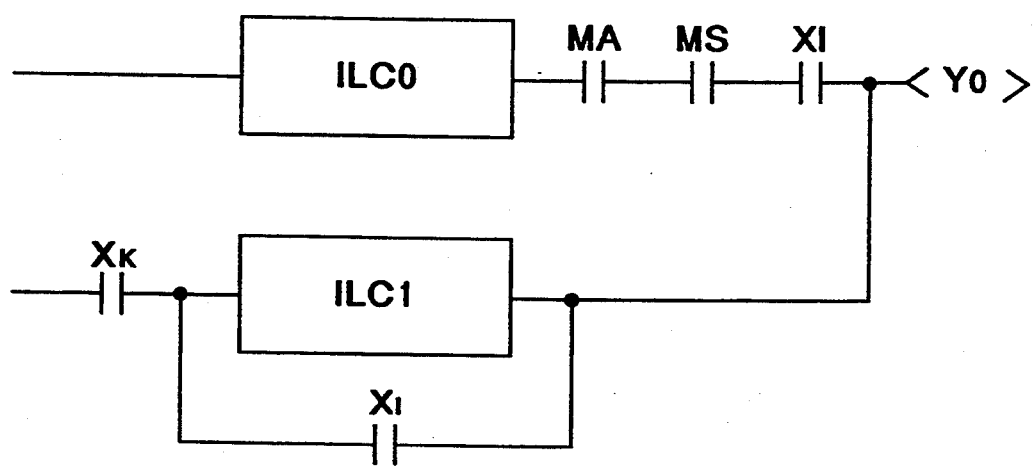
FIG. 13 is a diagram showing an example of the step ladder pattern.

FIG. 13 illustrates an example of a standard operating circuit used in the automatic generation of the whole sequence. Referring to FIG. 13, a condition $M_A$ is closed in an automatic mode (in which the operations of the production line are performed in accordance with the sequential control program). A condition $M_S$ is closed when this operating circuit operates in a manual mode. The condition $M_S$ is ordinarily closed. Accordingly, in the ordinary automatic mode, output $Y_0$ is issued if an interlock condition $ILC_0$ and an operation condition $X_1$ of the step which is prior by one are satisfied. On the other hand, $ILC_1$ describes the logic of an initiating condition in the manual mode. Since the contact $M_S$ is opened in the manual mode, $Y_0$ is output if conditions $X_k$ and $ILC_1$ are simultaneously satisfied or if the conditions $X_k$ and $X_I$ are simultaneously satisfied. Ordinarily, $X_I$ is a logic for nullifying the manual operation interlock condition $ILC_1$.

As is apparent from this relationship, the contact conditions $M_A$, $M_S$, $X_I$ and so on can be set by the system in a standardized manner without any troublesome manual programming work.

FIG. 16 shows an example of the system configuration of the embodiment of FIG. 5 as revised from the viewpoint of hardware configuration. As shown in the drawing, the present sequence-control/failure-diagnosis/recovery system comprises: a sequence control section 51 (which corresponds to the sequence control section 400 of FIG. 1 or the sequence controller 101 of FIG. 1), which is connected to equipment 50 to be sequence-controlled (which corresponds to the equipment 100 of FIG. 5 or the equipment 300 of FIG. 1) and which is adapted to perform sequence operation control over the equipment 50; an automatic generation section 90 (which corresponds to the sub-system 106 of FIG. 5); a failure diagnosis section 52 (which corresponds to the sub-systems 103, 104 and 105 of FIG. 5; and a CRT (cathode ray tube) operation panel section 53.

The sequence control section 51 has a built-in computer, equipped with a program memory 55 storing a sequence-operation control ladder program (FIG. 15), and a transmission/reception interface 54. The failure diagnosis section 52 includes a central processing unit (CPU) 62, a memory 63, an input/output interface (I/O interface) 64, and a transmission/reception interface 65, which are connected to each other through a bus line 61. The failure diagnosis section 52 is further equipped with a keyboard 66 connected to the I/O interface 64, a CRT 67 for display, and a printer 68. The CRT operation panel section 63 includes a CPU 72, a memory 73, a transmission/reception interfaces 74 and 75, and an I/O interface 76, which are connected to each other through a bus line 71. The CRT operation panel section 63 is further equipped with a hard disk device 77 connected to the I/O interface 76 and serving as an auxiliary memory, a CRT 78 for display, a keyboard 79 for entering data and control codes, and a touch panel 80 connected to the transmission/reception interface 74. The touch panel 80 is attached to the outer surface of the face plate section of the CRT 78.

The automatic generation section 90 is a section where a ladder program for sequence control (FIG. 15) and a ladder program for recovery are automatically generated. Regarding the sub-system for automatically generating a ladder program for sequence control, the present applicant has filed a patent application titled "Apparatus for Automatically Preparing Sequence Control Programs" (Japanese Patent Application No. 1-253991).

The transmission/reception interface 54 provided in the built-in computer of the sequence control section 51, the transmission/reception interface 65 provided in the failure diagnosis section 52, and the transmission/reception interface 75 provided in the CRT operation panel section 53, are connected to each other. Further, the transmission/reception interface 65 provided in the failure diagnosis section 52, the transmission/reception interface 75 provided in the CRT operation panel section 53, and the interface 96 of the automatic generation section 90, are connected to each other.

The failure diagnosis section 52 receives program processing data indicative of the operating conditions of the sequence-control ladder program and a simulation program, from the sequence control section through the transmission/reception interfaces 54 and 65, and processes it by the CPU 62 to obtain a display signal and an output signal which are based on the program processing data, supplying the former to the CRT 67, and the latter to the printer 68, through the I/O interface 64.

Next, to be schematically explained will be the procedures for automatically preparing a sequence control program for performing sequence control over the operations of the various items of equipment in a vehicle assembly line as described above.

The requisite data for automatically generating such a control program consists of a standardized "step ladder pattern" and "input/output map", and an "operation block map" and "operation step map" as described above. The standardized step ladder pattern is a data base storing the symbols of operation circuits representing all the operations necessary for the control program of a production line. The pattern described with reference to FIG. 13 is an example of such a standardized pattern.

The input/output map is generally a data base describing input/output relationships between a number of operation circuits which may be used in a production line. An example of the input/output map data is shown in FIG. 11. The standardized step ladder pattern data base and input/output map data base are data common to different production lines and not peculiar to some particular production line.

Data peculiar to a particular production line is of two categories: operation block map data and an operation step map data. The operation block map is data describing each of the above-mentioned operation blocks and the linkage relationships between them. FIG. 10 shows an example of the operation block map peculiar to the production line of FIG. 6. The operation step map is data describing the operation steps included in operation blocks peculiar to a particular production line. FIG. 12 shows an example of the operation step map peculiar to the production line of FIG. 6.

On the basis of these two standardized data bases and and the two types of data peculiar to a particular production line, a sequence control program is generated.

First, the generation of a standardized step ladder pattern data base will be described with reference to FIG. 14; FIG. 14A shows a pattern describing the start and stop of an operation block in a standardized form; FIG. 14B shows the same pattern as described with reference to FIG. 13; and FIG. 14C shows a pattern consisting of the pattern of FIG. 14B and a contact condition added thereto.

Next, to be described will be the input/output map (FIG. 11), which describes the input/output modes, beforehand, in the form of a table, with respect to all the items of equipment used in the production line. The input/output map shown in FIG. 11 is prepared for the positioning device 19 of FIG. 11. In this input/output map, the caption "Comment" indicates the kind of input/output operation. The "Nos." in this map are prepared automatically. Further, the data on the "Operation" and "Original Position" is entered through operation at the keyboard 67. The items of data: "Output Coil Device", "Confirmation Input Contact Device", and "Manual Input Contact Device" are set automatically.

For example, the operation type of the operation circuit corresponding to No. $A_{02}$, "BF (positioning)", is "Output", with the terminal of the output coil being $Y_1$. The confirmation input contact at the time of output is "$X_1$", and the contact for manual input is "$X_B$".

Next, the operation block map will be described. The data of this map is obtained by analyzing the operations of the production line concerned and expressing processes of that production line in terms of operation blocks in accordance with the above definition. The map of the operation blocks of FIG. 9 is a table expressing an operation block chart obtained by analyzing the production line of FIG. 6. In other words, the table (map) of FIG. 10 is substantially equivalent to the chart of FIG. 9.

In FIG. 10, the symbol "SC-REG" indicates 16-bit registers provided one for each of the operation blocks $B_0$ through $B_{11}$. Each of these registers indicates which operation step is being executed in the corresponding operation block. Assuming, for example, the operation step of $B_0S_0$ (see FIG. 12) is being executed in the operation block $B_0$, "$B_0S_0$" is stored in the SCREG of the operation block $B_0$.

The data under the caption "FROM" in the operation block map represents the operation block(s) which is (are) immediately before a particular operation block and which serve(s) as the activating condition for this particular operation block. For example, the activating condition for the operation block $B_3$ is the termination of the operation blocks $B_0$ and $B_1$. The data under the caption "TO" in the operation block map indicates the operation block(s) immediately after a particular operation block and adapted to start operation upon the termination of this particular operation block. For example, the termination of the operation block $B_3$ implies the start of the operation blocks $B_5$ and $B_7$. The "Clear Condition" indicates the operation block(s) for restoring the equipment related to the operation block in question to its original condition. Further, the caption "Equipment" indicates the equipment to be sequence-controlled which is related to the operation block in question.

The table contents under the captions "No." and "SC-REG" are generated automatically. On the other hand, those table contents under the captions "Block Name", "FROM", "TO", "Clear Condition" and "Equipment" are entered by the programmer through operation at the keyboard 67.

Next, the operation step map of FIG. 12 will be described. As stated above, an operation step map describes the specific operations in each operation block. In other words, an input/output map (FIG. 11) does not represent an operational sequence. However, it also represents the operational sequence of each item of equipment in an operation step map. FIG. 12 shows an example of the operation step map for the operation block B0. In FIG. 12, the data under the caption "No." is automatically given by the system. That is, regarding the data under the caption "No." representing the operation step order, e.g., for the operation block $B_0$, it is generated by the system each time the programmer enters a "Comment" through the keyboard 67, starting from "$B_{000}$" to "$B_0S_0$"-"$B_0S_9$". The step "$B_{000}$" is an operation step implying the preparation for the operation block in question, and is placed at the head of each operation block in the ladder program. Further, the step "$B_{999}$" is an operation step implying the termination of the operation block in question, and is placed at the end of each operation block in the ladder program.

The data constituting the minimum requirements for the generation of an operation step map is the "Comment" information entered in order of step sequence. If, for example, the programmer enters "Condition Confirmation" at the step No. "$B_0S_0$" the item of data of No. "$A_{01}$", placed at the head of the input/output map and having the comment name of "Work Present", is read out. Since the confirmation input contact and the manual input contact for the data of "$A_{01}$" of the input/output map are "$X_0$" and "$X_A$", respectively, these items of data are written to the corresponding positions of FIG. 12. The output coil of the step $B_0S_0$, "$Y_0$", is an output name imparted to the operation step at the head of an operation block. Subsequently, when, in the operation step "$B_0S_1$", the programmer enters the comment "BF (positioning)" and the operation type "Output", the input/output map is searched for on the basis of this title, whereby the data corresponding to No. "$A_{02}$" is obtained. Since the confirmation input contact and the manual input contact for the data of "$A_{02}$" of the input/output map are "$X_1$" and "$X_B$", respectively, data corresponding to the operation step "$B_0S_1$" of FIG. 12 is written.

In this way, the operation step map (FIG. 12) is prepared by searching the input/output map (FIG. 11) for corresponding data on the basis of the "Comment" and "Operation Type" entered by the programmer. Such an operation step map is prepared for each operation block.

In the operation step map of FIG. 12, the data $\tau$ indicates the estimated operation time in each operation step. The data $\tau$ is significant in detecting and judging the "step time over" and "step hang-up" failures mentioned above.

Figure 15:
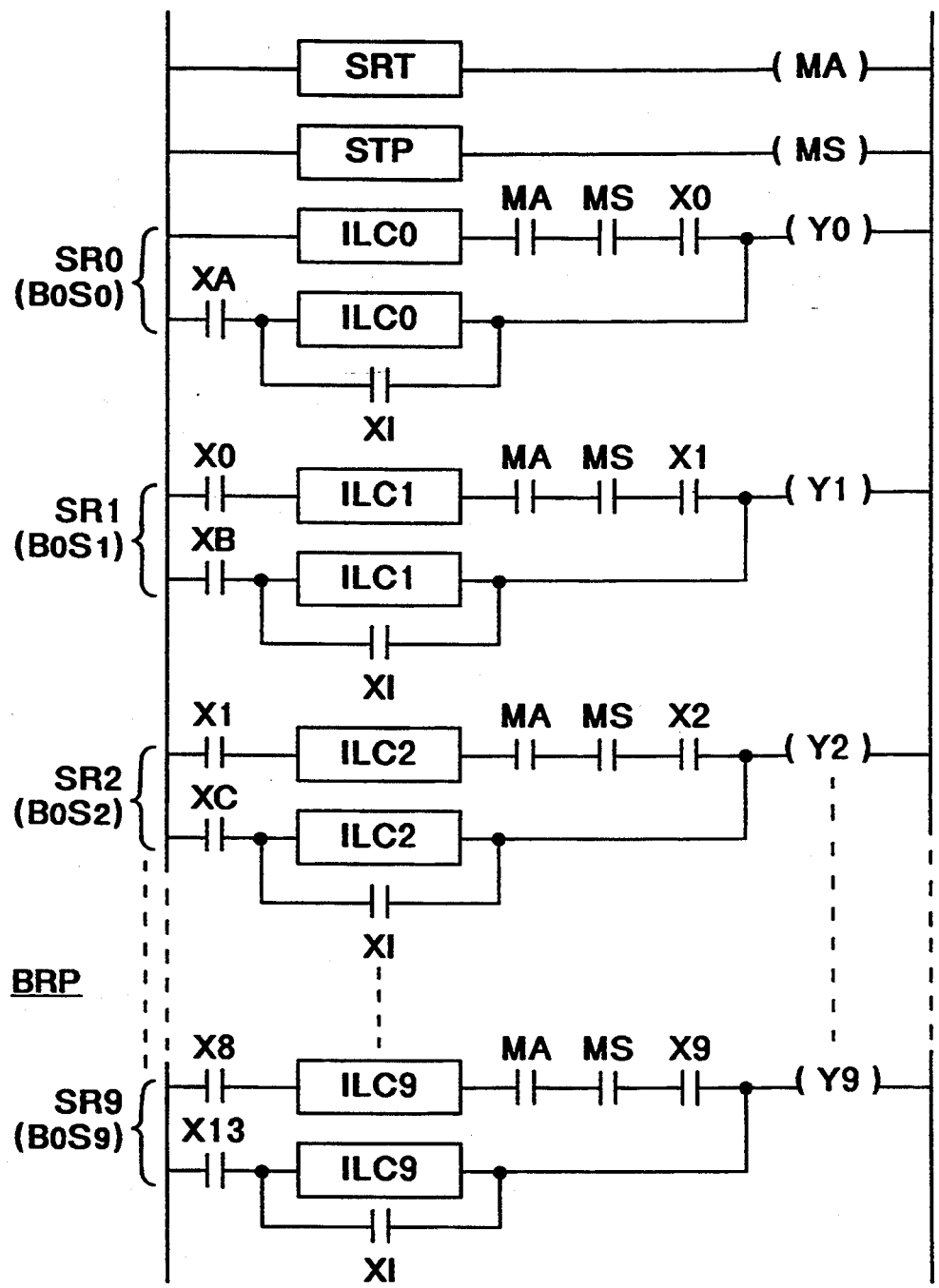
FIG. 15 is a diagram showing the ladder program elements with respect to the operation block shown in FIG. 13.

FIG. 15 shows a sequence ladder program on the operation block $B_0$ generated in this way. A comparison of the ladder program of FIG. 15 with the operation step map of FIG. 12 will help to understand ladder program construction well. In the operation step $B_0S_0$, for example, the contact device $X_0$ is closed in the automatic operation mode, in which the contact $M_A$ is closed, so that the output $Y_1$ is emitted. When the output $Y_1$ is emitted, the confirmation input contact in $B_0S_1$, $X_0$, is closed, so that $Y_1$ is outputted.

From the above explanation of the automatic generation of a sequence control ladder program in the system of the second embodiment, it will be understood how the operations of different operation blocks are correlated with each other in accordance with an operation block map (FIG. 10), and how efficiently the automatic generation of a control program is effected in accordance with an operation step map and an input/output map (FIG. 11).

Sequence-Control/Monitoring/Failure-Diagnosis

The automatic generation of a ladder program in the system of the second embodiment is effected as described above. Further, it will also have been understood from the above description what the operation block map and the operation step map are.

Figure 17:
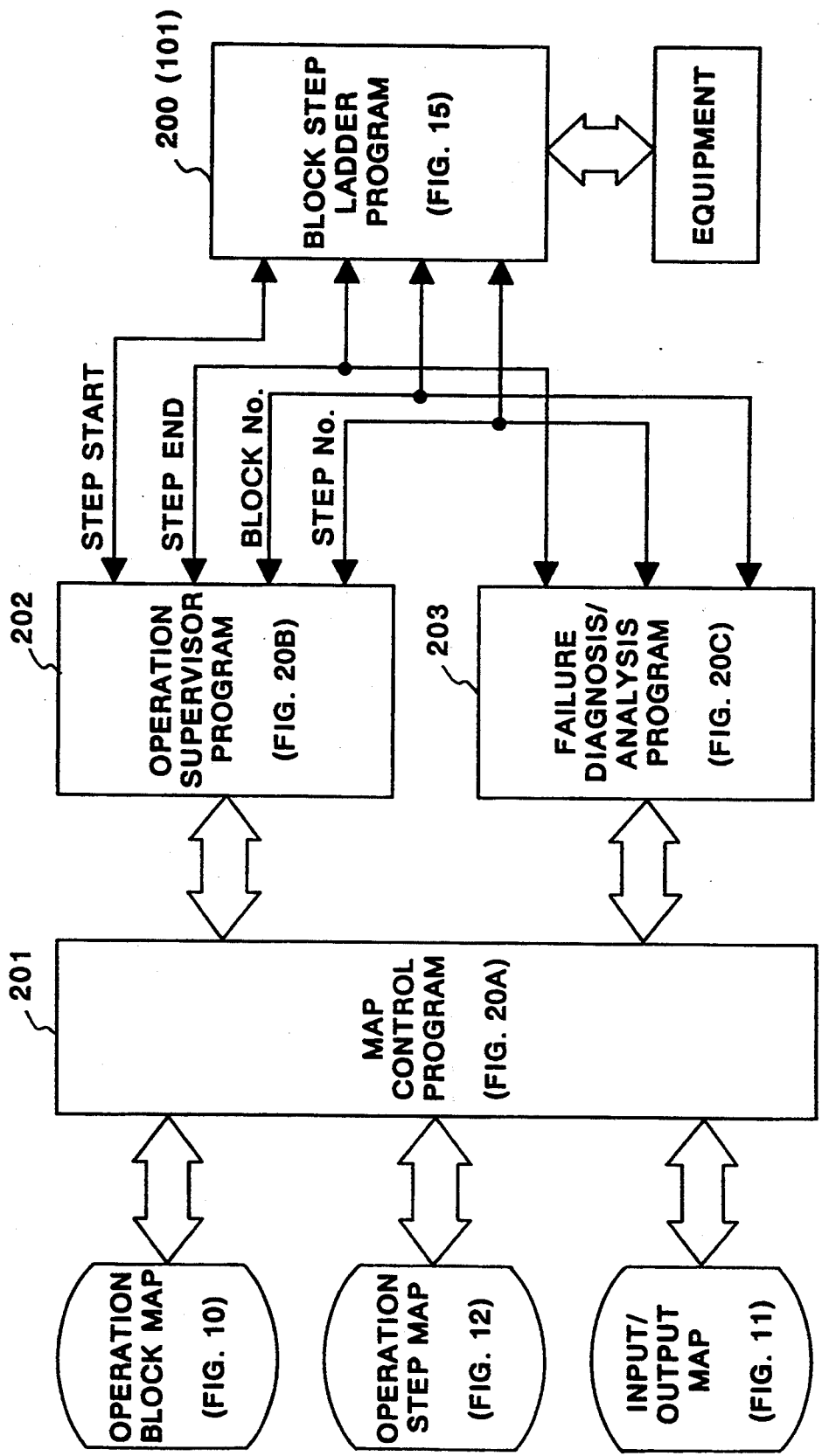
FIG. 17 is a diagram illustrating the relationship between the ladder program, the sequence control program, the supervisor, and the failure diagnosis program, in the system of the second embodiment.

FIG. 17 is a block diagram illustrating the relationship between the control programs in the failure-detection/failure-diagnosis sub-systems 104 and 105 of FIG. 5, and the relationship between them and the step ladder program 200 (indicated by the reference numeral 101 in FIG. 5). With reference to this block diagram, the sequence control, the monitoring and the failure diagnosis in the present system will be described. The above-described program for automatic program generation is a program operating separately from the sequence control and failure diagnosis, whereas, as will become apparent from the description below, the sequence control program and the failure-detection/supervisors operate in close relation to each other.

In FIG. 17, the step ladder program 200 consists of a ladder program as shown in FIG. 15, which describes, as explained with reference to FIG. 15, the specific operations of the individual actuators in different operation steps. Further, the map control program 201 monitors the equipment operations executed by the ladder program 200 while referring to the operation block map (FIG. 10) and the operation step map (FIG. 7). This map control program is shown in detail in FIG. 20A. The operation supervisor 202 detects the occurrence of any failure while monitoring the data exchange between the map control program 201 and the ladder program 200. This operation supervisor 202 is shown in detail in FIG. 20B. Further, the failure diagnosis program 203 performs failure diagnosis when informed of the occurrence of any failure through notification by the operation supervisor 202. The actuator (i.e., the operation step) in which the failure has occurred can be known through examination by means of the diagnostic program 203, which examines the contents of a counter described below, which are recorded by the supervisor 202 and the map control program 201. Regarding specific devices or contacts in the actuator, they can be detected by the diagnostic program 203 on the basis of the data of the input/output map (FIG. 11).

Before the failure diagnosis system can be understood, it is necessary to understand the above-described SC-REG (abbreviated as "CS"), etc., set for each operation block.

FIG. 18 is a diagram illustrating a CS register as mentioned above, time registers ($TS_{si}$, $TS_{ei}$), and a block time register $TB_s$, which are provided in a block i ($BL_i$). The CS register $CS_i$ stores the number of that operation step in the block i which has been executed last. The step time register $TS_{si}$ stores the time at which the operation step executed that has been executed last or that is being executed was started. The step time register $TS_{ei}$ stores the termination time of the operation the execution of which has been terminated last. The value of the block time register $TB_i$ remains zero until the block concerned becomes ready for activation, when this register TBi stores the time at which that block has become ready for activation.

Step Time Over

Figure 19:
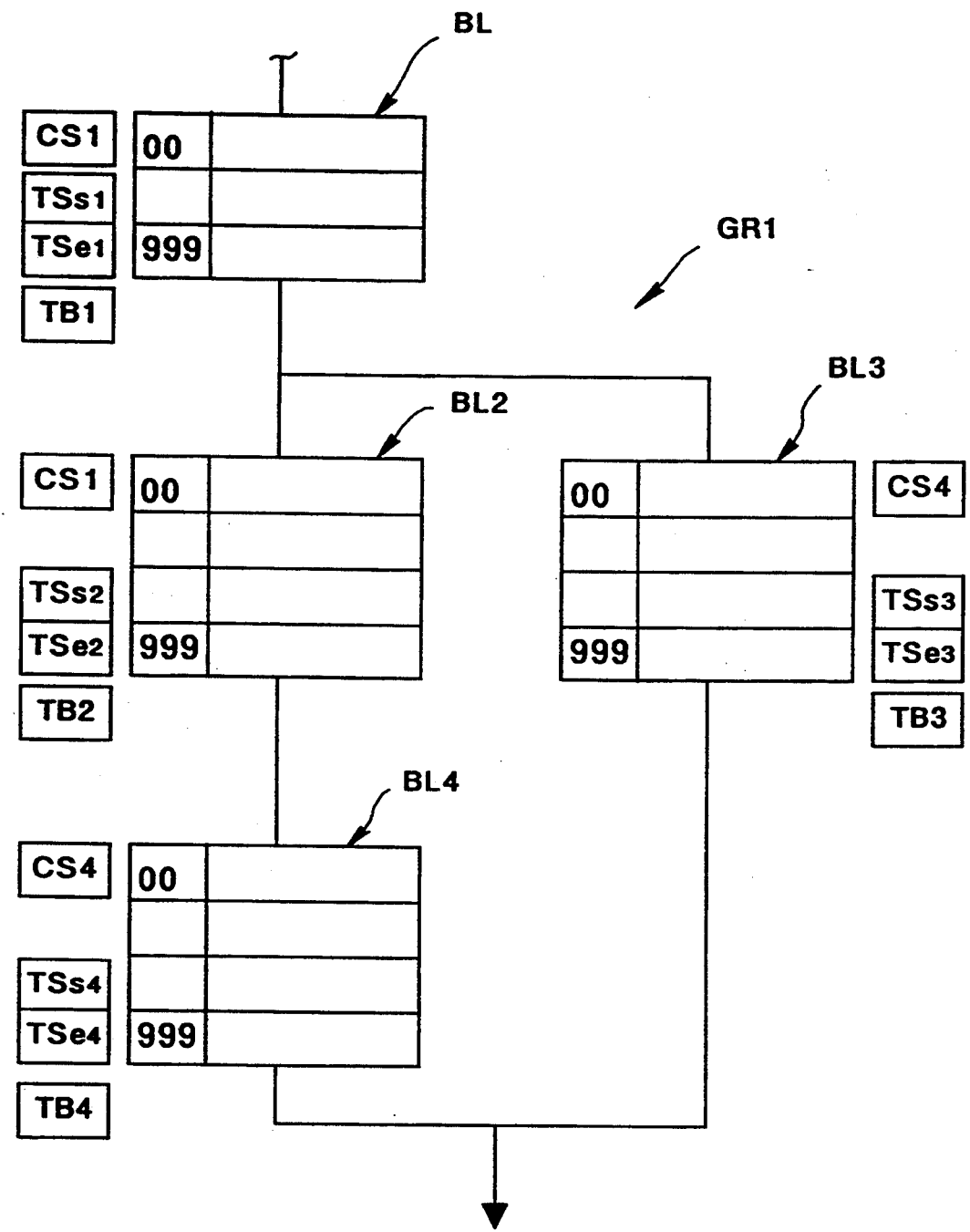

FIG. 19 shows how registers as described above are set for each of the blocks.

The time the execution of an operation step has taken can be expressed as follows, at the time of its termination:

$$TS_{xi} = TS_{ei} - TS_{si} \qquad (1)$$

As stated above, the counter $CS_i$ stores the number of the operation step in which the block i has terminated its execution last (In practice, it indicates the number of the operation step subsequent to the above step), so that the time the execution of the operation step terminated last has taken, $TS_{xi}$, can be calculated from the value of this counter $CS_i$. In the failure diagnosis system of the second embodiment, this $TS_{xi}$ is compared with a standard time $\tau$, which is the time needed for the execution of each of the operation steps stored in the operation step map of FIG. 12. It is determined that some trouble (a "step time over" failure as mentioned above) has occurred to the execution of the operation step in question if, as a result of this comparison, the following inequality holds true:

$$TS_{xi} - \tau > \delta_0 \qquad (2)$$

where $\delta_0$ is a constant.

Step Hang-Up

In the present failure diagnosis system, any operation step the execution of which has not been terminated in time is scanned. An operation step is judged to be in a loop or hang-up condition if the time which has elapsed up to the present, $T_p - TS_{si}$, satisfies the following inequality:

$$T_p - TS_{si} > \delta_1 \qquad (3)$$

where $\delta_1$ is a constant, which consists of the maximum of the times needed for the execution of the operation steps in a production line, with certain tolerances imparted thereto. This type of failure is referred to as a "step hang-up" condition.

Block Hang-Up

An explanation will be given of "Block Hang-Up" with reference to FIGS. 19 and FIGS. 23A through 23E.

As shown in FIG. 19 or FIG. 9, there exist a plurality of blocks which carry out concurrent operations with respect to each other. Regarding such blocks as one group, it is necessary to monitor the time elapsing from the termination of all the step operations of one group (In the example of FIG. 19, BL1 forms one group) until the execution of another group subsequent thereto (In the example of FIG. 19, it is the group GR1 consisting of BL2, BL3, and BL4). The above-mentioned block time register $TB_i$ indicates the time that elapses until the start of the above block group. For each group, the measured operation time is monitored by comparing it with the corresponding reference time, whereby any abnormality in each group, in other words, any failure occurring during the transition from one block to another, can be diagnosed. A failure of this type is referred to as "block hang-up". When, in the system of the second embodiment, a block hang-up failure has occurred, the operation step which has caused it is located.

Figures 23A, 23B:
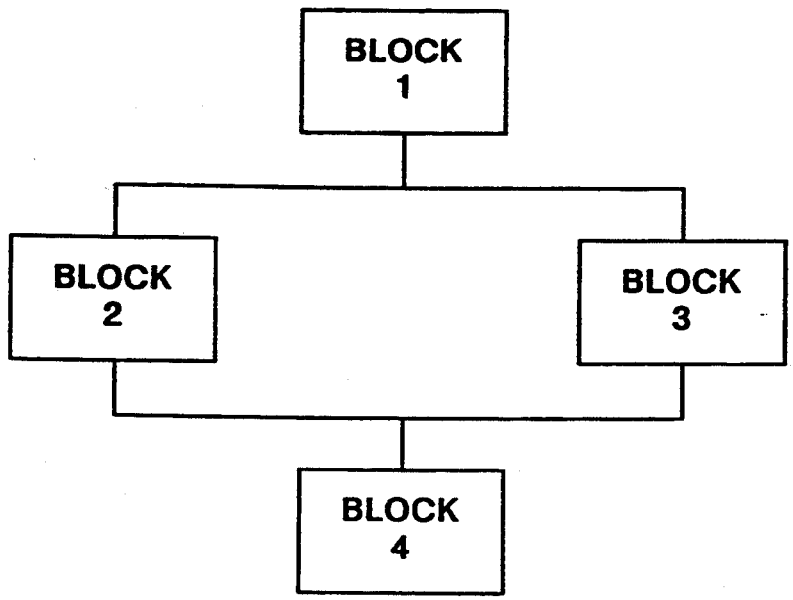

A method of locating an operation step causing "block hang-up" will be described with reference to FIGS. 23A through 23E, which are drawings illustrating the production line of FIG. 9 in a simplified form with a view to facilitating the understanding of "block hang-up". For the sake of simplicity, FIG. 23A shows the production line as composed of four operation blocks. FIG. 23B shows, in a simplified form, an operation block map corresponding to these operation blocks.

In FIG. 23B, the time required for block 2 to be activated following block 1 is expressed as $\Gamma_{12}$, the time required for block 3 to be activated following block 1 as $\Gamma_{13}$, and so on. This is because these transition times $\Gamma$ can be set previously. For example, block 4 is started upon the termination of the parallel blocks 2 and 3. As described in connection FIG. 19, the value of the block time register $TB_i$ remains zero until the block concerned becomes ready for activation. When the block has become ready for activation, the time at which it has become so is stored. Thus, when the value of the register TBi is not zero and the time elapsing until the present is longer than the above $\Gamma$, it may be determined that block hang-up has occurred. Accordingly, if block 4 has not been started even when the times $\Gamma_{24}$ and $\Gamma_{34}$ have elapsed since the termination of blocks 2 and 3, it is determined that a block hang-up failure has occurred.

If a block hang-up condition has been detected as a result of block 4 having not been started, the operation step which has caused the condition ought to be in either block 2 or block 3. FIG. 23C shows an operation step map corresponding to operation block 2 and FIG. 23D shows an operation step map corresponding to operation block 3. According to FIG. 23C, four operation steps are set in block 2. The respective outputs of these steps are $Y_1, Y_2, \ldots, Y_4$, and the confirmation switches for the actuators thereof are $X_1, X_2, \ldots, X_4$. Further, according to FIG. 23D, three operation steps are set in block 3. The respective outputs of these steps are $Y_5, Y_6$ and $Y_7$, and the confirmation switches for the actuators thereof are $X_5, X_6$ and $X_7$. The respective conditions of the above-mentioned confirmation switches $X_1$ through $X_7$ at the time blocks 2 and 3 are terminated are peculiar to each block and predictable. The activating condition map of FIG. 23E shows the activating conditions for the four operation blocks shown in the example of FIG. 23A, i.e., the state logic for the confirmation switches. This will be explained with reference to block 4. In block 2, the outputs $Y_1$ through $Y_4$ are ON and the confirmation switches $X_1$ through $X_4$ are ON, and, in block 3, the outputs $Y_4$ through $Y_7$ are ON and the confirmation switches $X_4$ through $X_7$ are ON. Accordingly, when block 4 has been normally started, the following condition ought to hold true:

$$X_1 * X_2 \ldots * X_7$$

Blocks 2 and 3 are started upon the termination of block 1. Accordingly, the activating condition for blocks 2 and 3 is the logical product of the conditions of the confirmation switches for all the operation steps of block 1. In FIG. 23E, the symbol $<N>$ implies that the confirmation switch is in the condition in which it confirms the "forward" state of the output Y, and the symbol $<I>$ implies that the confirmation switch is in the condition in which it confirms the "return" condition of the output Y.

In this way, the conditions of the devices for confirming the outputs of all the operation steps of the operation block in the previous stage of a particular operation block are programmed in the form of a logical product and used as the activating condition for that particular operation block, whereby it is so arranged that the operation block in question is only started when the normal termination of all the operation steps of the operation block in the previous stage has been confirmed. In other words, unless the activating condition is satisfied, a block hang-up condition as described above occurs, thus making it possible to accurately detect any failure. Furthermore, with the block where the failure has occurred having been located, a comparison of the activating condition map with the actual condition of the corresponding confirmation switch enables the switch which is out of order to be located quickly. Further, by referring to the input/output map (FIG. 11) and the operation step map (FIG. 12), it is possible to quickly find out which output actuator of which operation step has been out of order.

Experience shows that it may happen, in the sequence control of a production line, that the actuator of an operation step stops in a condition which corresponds to neither "forward" nor "return" or in a condition in which it exhibits a state corresponding to both "forward" and "return". This is partly due to the fact that the heavy actuator makes a bound to get into a "halfway" condition where it is in neither the "forward" nor "return" state. Despite such a halfway condition, the sequence control will apparently proceed in the normal manner, and it is only determined that a failure has occurred when a failure confirmation switch indicates that the corresponding operation step (in another operation block) which ought to have been started has not been started yet. At this point, the sequence control is stopped. However, the point at which it stops is in all probability far away from the operation step where the failure has actually occurred.

In accordance with the block hang-up detection method of the second embodiment, the AND of the logical conditions all the confirmation devices of the previous operation block should be in is set as the activating condition for each operation block, as shown in FIG. 23E, so that if the actuator gets into such a halfway condition as mentioned above in an operation step of an operation block and the detection of a failure is thereby prevented, the occurrence of block hang-up can be ascertained when that operation block is terminated and the subsequent operation block is started. That is, the operation step in which the failure has occurred is not too far away, in terms of both time and space, from the operation step in which the occurrence of the failure is recognized, thus making it possible to perform accurate failure diagnosis and effect quick recovery.

When a failure due to step time over, step hang-up, block hang-up, etc. as described above, has been detected, the operation step in which the failure has occurred is located, whereby it is possible to locate the actuator which is out of order from the operation step map (FIG. 12). This is because one operation step corresponds to one actuator, as shown in FIG. 12. Here, it is necessary to ascertain the condition any malfunctioning actuator that is at a stop is in, i.e., the condition the LSs (the two limit switches respectively corresponding to "forward" and "return") defining the operation of this actuator are in.

The input/output map of FIG. 11 and the operation step map of FIG. 12 are used to find out the condition of these LSs. In the operation step map of FIG. 12, an actuator identification number column is provided. Each of these identification numbers (e.g., $A_{01}$) indicates the actuator to be used in the corresponding step (e.g., $B_0S_0$). These identification numbers respectively correspond to the individual items of the input/output map. The input/output map of FIG. 11 not only indicates the operation type and contact names of each actuator but also describes the relationship between the contact indicating the "forward" state and that indicating the "return" state. Since an actuator makes a reciprocating movement, the "forward" and "return" states invariably exist in a pair for each actuator. In the input/output map of FIG. 11, the data under the caption "Correspondence" describes this pair relationship. For example, in the Correspondence section corresponding to the actuator BF (which is identified by the number A02), the number "A03" is inscribed. That is, the condition in which the BF actuator is in the forward state is fixed by the number A02, thereby indicating that the return state corresponding to this forward state is to be found under the number A03.

Accordingly, with the number of the malfunctioning operation block and that of the malfunctioning operation step having been obtained, the failure diagnosis system can ascertain the identification number of the corresponding actuator from the operation step map, and, from this number, what types of LSs are set in this malfunctioning actuator. When the LSs provided have been ascertained, the system reads out the condition thereof and informs the operator of the failure condition, for example, by displaying it.

The input/output map of FIG. 11 is independent of the operation step map (FIG. 12) and the ladder program (FIG. 15), which describe the actual operational sequence. That is, if the production line is changed and the corresponding operation map (FIG. 12) and ladder program (FIG. 15) are modified, there is no need to modify the input/output map. In other words, the trouble of modifying the failure diagnosis program each time the production line is changed has been eliminated.

The above-mentioned standard execution time $\tau$ is determined, for example, by the average value of measurement times obtained with respect to a cycle of a predetermined number of repetitions when it is operating normally, $\overline{TS_{xi}}$, and a standard deviation $\sigma$. It is preferably defined, for example, as follows:

$$\tau = \overline{TS_{xi}} + 3\sigma \qquad (4)$$

More preferably, the data $\tau$ should be updated for each cycle because the operational characteristics of an actuator is subject to secular change. Further, it is desirable that the time $\Gamma$ used to detect block hang-up (see the operation block map of FIG. 10) be also updated taking secular change into account, on the basis of the time actually required.

Control Procedures

Next, the control operation in the system of the second embodiment will be described with reference to FIGS. 20A through 20C.

Figure 20A:
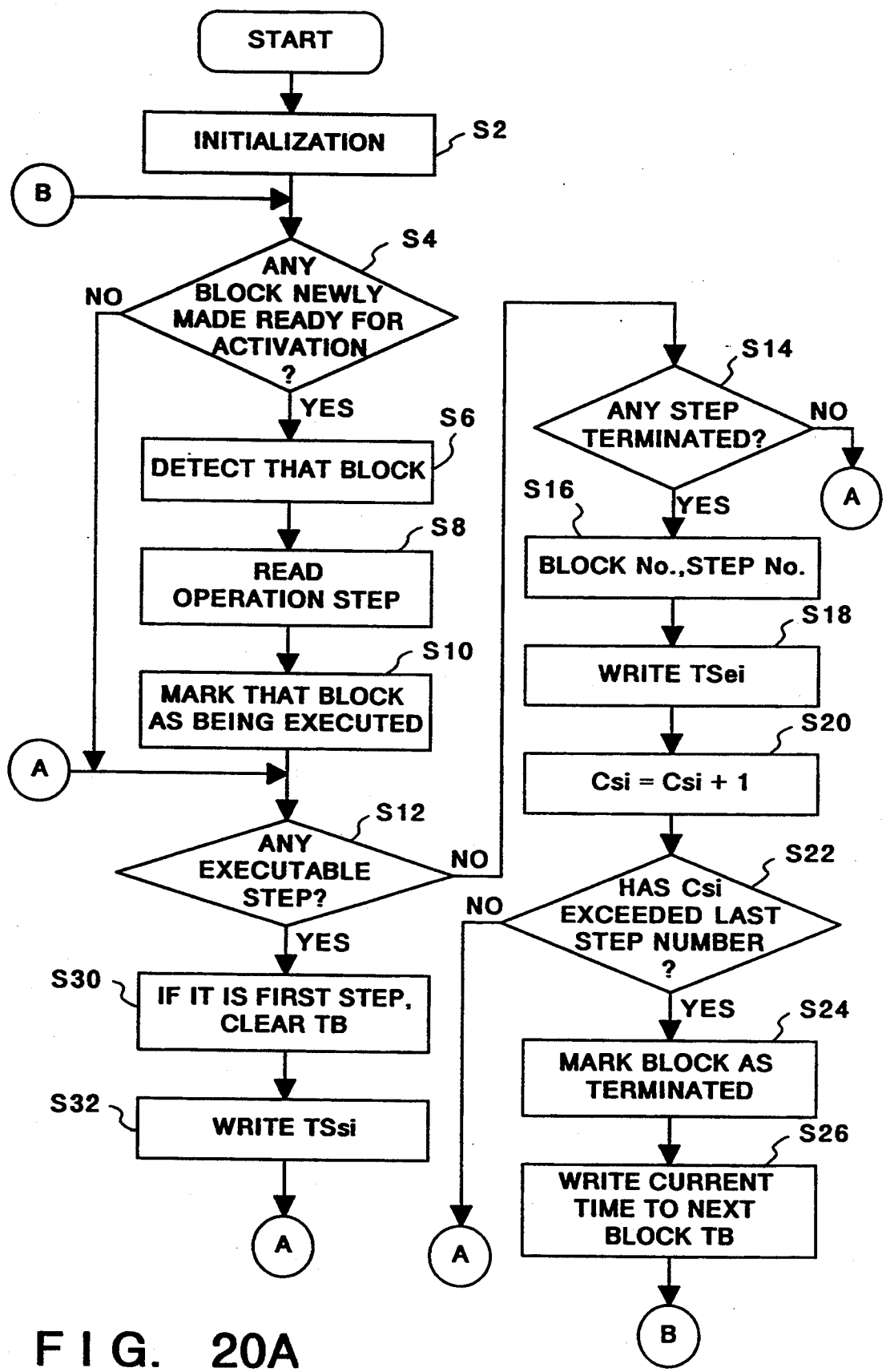
FIGS. 20A through 20C flowcharts respectively illustrating the control procedures for the sequence control program, the supervisor, and the failure diagnosis program in the second embodiment.

FIG. 20A shows the control procedures of the map control program 201, which monitors the operation of the ladder program map 200 for operating the actuators of the production line concerned in accordance with the operation block map and the operation step map. When this program is activated, initialization is first effected in step S2, detecting the first block group that is ready for activation. This block group may consist of a single block or a plurality of blocks.

In step S4, it is examined whether or not there is any block which has been newly made ready for activation. The procedure of this step S4 is carried out mainly with a view to checking whether or not there exists, after the termination of all the steps of a particular operation block, an executable operation block subsequent to this operation block. If there exists such an operation block (When the operation has been activated with step S2, there ought to exist an executable operation block), the identification number of that block is detected in step S6. It is naturally possible for this block number, which is referred to as i, to consist of a plurality of numbers since in some cases operation blocks are executable in a group.

In step S8, the operation step map of such an operation block is read, and, in step S10, that operation block is marked as being executed. In step S12, it is examined whether there exists an executable operation step or not. An operation step is executable when the operation thereof as indicated by the CS register has been terminated. This examination is performed in step S54 (FIG. 20B) of the supervisor 202. If there is an executable operation step in the operation block concerned, the current time is written, in step S32, to the timer register $TS_{si}$ of that operation block, as the start time. The procedure of step S32 is carried out as long as there exists an executable operation step. If one group consists of a plurality of operation blocks, one operation step will be executed in each of those operation blocks.

When all of the executable operation steps have been activated, the judgment result in step S12 is NO until the operation of any one of these operation steps has been terminated, the procedure moving to step S14, where the termination of any one operation step is waited for.

When a termination signal indicating the termination of the execution of an operation step has been transmitted to the sequence control program from the ladder program side, the procedure moves from step S14 to step S16, where the number of the operation block that has been terminated, i, and that of the operation step (see FIG. 17) are read. By virtue of this number i, the operation block including the operation step which has been terminated can be located. In step S18, the termination time is written to the timer register $TS_{ei}$ of the operation block in question, and, in step S20, the CS register is incremented by one so as to indicate the operation step to be executed next.

By carrying out these operations, the CS register of the corresponding block is updated successively, starting from the operation step that is the first to terminate the actuator operation, and, at the same time, $TS_{ei}$ is also updated.

Figure 20B:
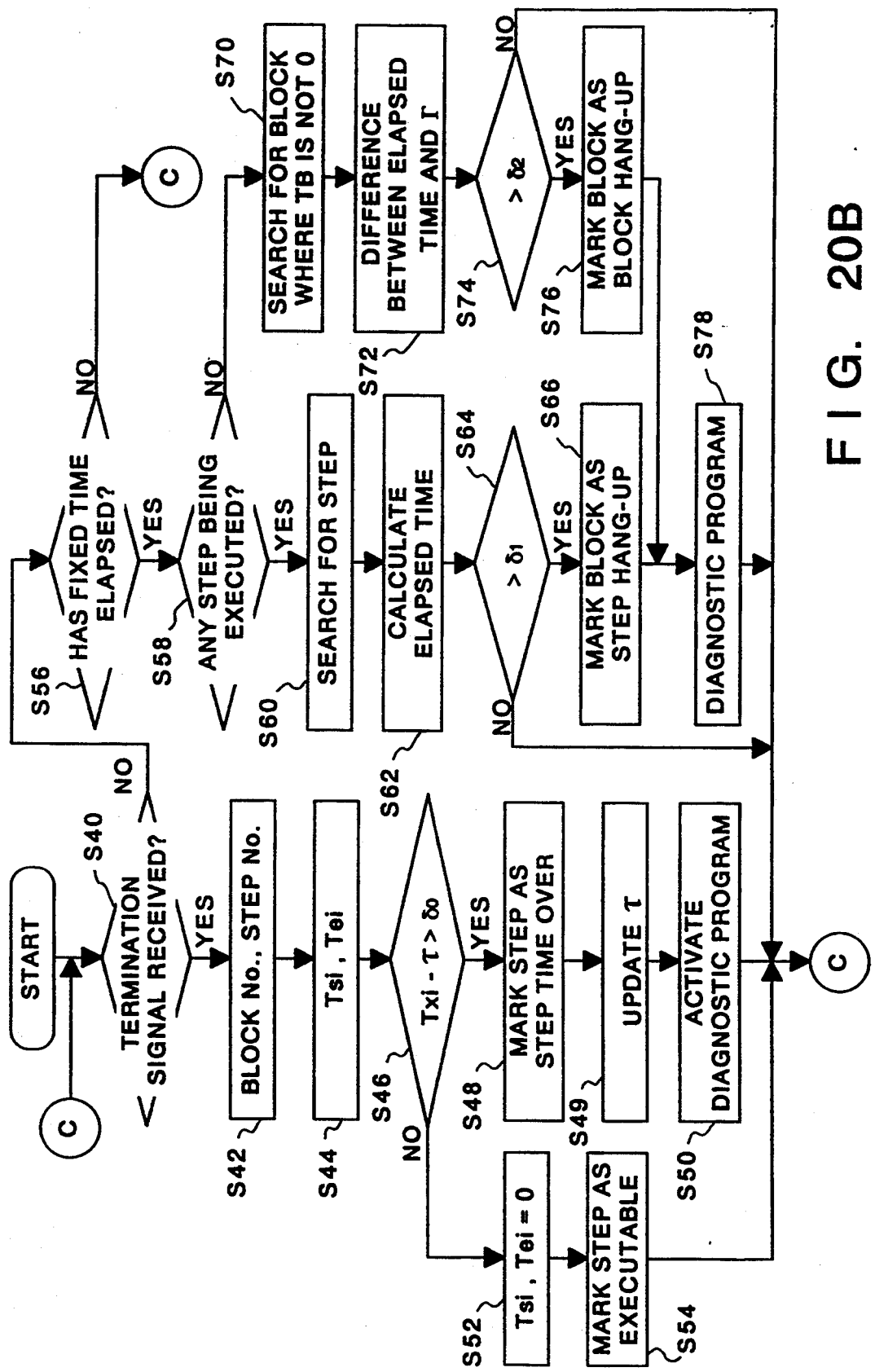
Figure 20C:
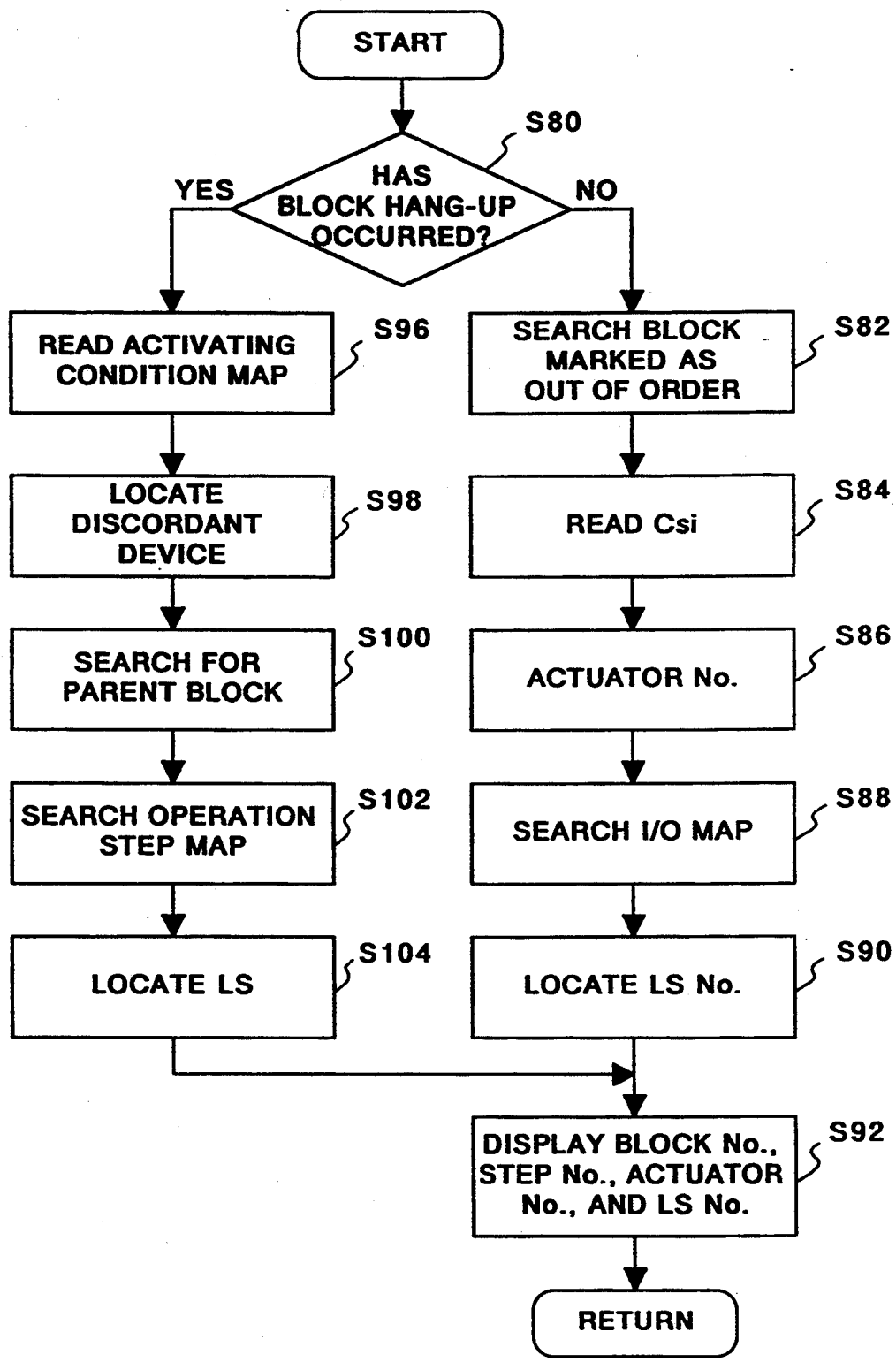

Meanwhile, in step S40 of FIG. 20B, the supervisor 202 checks if there is any step termination signal from the ladder program 200. If actuator operation has been terminated in any one of the ladder elements, the procedure moves on to step S42, where the block number i and step number in question, supplied from the ladder program side, are read out. Then, in step S44, the timer values $TS_{si}$ and $TS_{ei}$ of that block are read out from this block number i, and the estimated execution time $\tau$ of the operation step concerned is read from the operation step map, the elapsed time $TS_{xi}$ being calculated in accordance with equation (1). Then, in step S46, a judgment is made as to whether the time needed for execution, $TS_{xi}$, has been abnormally long or not.

If the judgment in step S46 is OK, the procedure moves on to step S52, where the value of the timer register of the operation block concerned is cleared. In step S54, the operation step currently indicated on the register $CS_i$ is marked as executable. This operation step indicated by $CS_i$ is the operation step subsequent to the one which has been terminated, i.e., the one obtained as a result of the updation in step S20.

When an operation step in an operation block has been marked as executable, the judgment in step S12 of FIG. 20A of the sequence control program is YES, the next operation step being executed.

Operation steps are thus executed one after another, until, in step S22, the value of the CS register exceeds the number of the last step with respect to an operation block, i.e., all the processings of that operation block have been terminated. Then, in step S24, the block in question is marked as terminated, and, in step S26, the current time is written to the timer $TB_{ij}$ for the block to be activated subsequent to the current block. Here, $TB_{ij}$ is a timer for explicitly indicating the presence of a block j to be activated after the termination of the block i, and corresponds to $\Gamma_{12}$, etc. of FIG. 23B. The timer register TB is cleared in step S30 when the first operation step of the operation block to be activated next has been activated.

The procedure returns from step S26 to step S4, where an operation block which has newly become executable is searched for. For example, if, in the case of FIG. 9, the processing of B1 has not been terminated yet when the processing of B0 has been terminated and the procedure has returned to step S4, B3 is not marked as executable.

Next, the procedure returns to step S46 of FIG. 20B. Here, a method of detecting a step time over failure will be described.

Figure 20D:
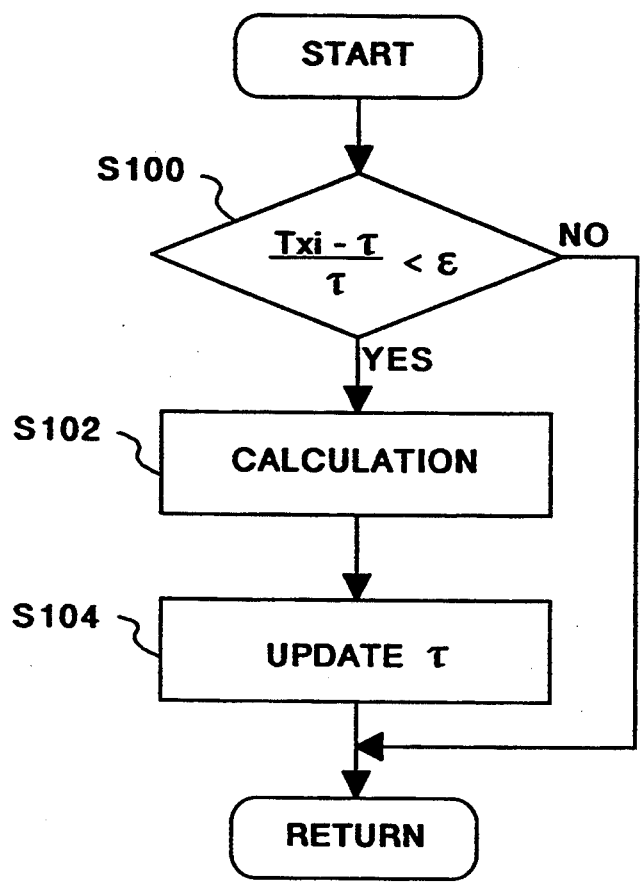
FIG. 20D flowchart illustrating the control procedure for adjusting the anticipated time for executing an operation step to the corresponding actual data in the second embodiment.

If, in step S46, it is determined that $TS_{xi} - \tau > \delta_0$, the execution of the operation step in question has taken abnormally long, so that, in step S48, the operation block to which that operation step belongs is marked as out of order, the estimated execution time, $\tau$, being updated in step S49. This updating processing is shown in detail in FIG. 20D. In the case where the difference between the time the proceeding of an operation step has actually taken, $T_{xi}$, and the estimated time $\tau$, is small, that is, $$\frac{T_{xi} - \tau}{\tau} < \epsilon \, (<<1)$$

and the time that has actually taken, $T_{xi}$, is somewhat longer than $\tau$, it is determined that a condition attributable to secular change has occurred, and, in step S102, the value of $\tau$ for the next time is updated through calculation from the $T_{xi}$ values in the past and that of this time. This updating process makes it possible to perform accurate failure detection in which secular change is taken into account.

In the control procedures of FIG. 20B, the procedure returns to step S40 after the diagnostic program (FIG. 20C) has been activated in step S50. The reason for the procedure returning to step S40 is to detect any failure in operation steps of other operation blocks. Further, the reason for not stopping the execution of the sequence control program (FIG. 20A) upon detection of any failure is that if a particular operation block is stopped, there exists an operation block which is to perform concurrent operation, so that the operation of that block must not be stopped. If there is no need to stop other operation blocks, that is because each operation block is defined on the premise that it is to operate independent of the other operation blocks.

The procedures from step S56 onward are carried out for the purpose of detecting any block hang-up or step hang-up.

The processing for coping with a ladder program hang-up failure in an operation step will be explained. In this case, no termination signal is generated. Accordingly, the procedure moves from step S40 to step S56, where it is checked whether the time between the instant the procedure moved to this step and the instant the current time (the time $T_p$) has exceeded a fixed value. In other words, the occurrence of any block hang-up or step hang-up is checked with respect to each of such fixed periods. In step S58, an operation step marked as being executed is searched for. It is an operation step in which the value of each CS register of an operation block marked as being executed is fixed, and in which $TS_{ei}$ has not been updated yet although the start time has been written to $TS_{si}$. In step S60, the time which has elapsed until the present, $T_p - TS_{si}$, is calculated, and, in step S62, a judgment is made in accordance with formula (3) mentioned above:

$$T_p - TS_{si} > \delta_1 \quad (3)$$

If the result of the judgment is YES, the procedure moves on to step S64, where the block in question is marked as being in a step hang-up failure condition.

If, in step S58, it is determined that there is no operation step being executed, the processing described below is carried out. In that case, a block j in which the value of the block time register $TB_{ij}$ is not zero is searched for in step S70. As described in connection with step S26, the fact that the value of $TB_{ij}$ is not zero implies that the corresponding block j has not been activated yet although the previous block i has been terminated. In step S72, the difference between the elapsed time in such a block, with the operation steps thereof unactivated, and the above-mentioned estimated time $\Gamma_{ij}$:

$$(T_p - TB_{ij}) - \Gamma_{ij}$$

is calculated. If the difference is larger than the constant $\delta_2$, it is determined, in step S76, that a block hang-up failure has occurred. In step S78, the diagnostic program (FIG. 20C) is activated.

The diagnostic program 203 will now be described with reference to FIG. 20C.

The processing of this diagnostic program somewhat varies depending on whether the failure is due to block hang-up or step time over or a step hang-up. If a step time over or a step hang-up failure is detected, the operation step where the failure has occurred can be directly located, whereas, in the case of a block hang-up failure, it is necessary to trace the operation step where the failure has occurred.

In the case of a failure due to step time over or step hang-up, the block marked as out of order is searched in step S82. This marking is effected in step S48 or S66. In step S72, the data of the CS register of the block detected is read, thereby locating the operation step where the failure has occurred. In step S74, the identification number of the malfunctioning actuator is ascertained from the operation step map. In step S76, the input/output map (FIG. 11) is searched on the basis of this identification number, and, in step S78, the numbers of the forward and return LSs of the actuator having this identification number are ascertained. In step S80, the number of the malfunctioning operation block as well as the operation step, the actuator, and the LSs that have been thus ascertained are displayed so as to draw the operator's attention to the failure condition.

An explanation will be given of the processing to be carried out when in step S80 a block hang-up failure has been detected. In this case, the activating condition map corresponding to the number of the block where the block hang-up has been detected (FIG. 23E) is read in step S96. In step S98, the logic states of the confirmation switches as written to the map are compared with the actual states of these confirmation switches, searching for any confirmation switch whose actual logic state differs from that on the map. If no such discordant switching device has been located, the procedure moves on to step S100, where the block map (FIG. 10) is searched for the parent block of the operation block where the hang-up has been detected. In step S102, the operation step using the discordant switch mentioned above is located from the operation step map (FIG. 12) of the parent block detected, and from this, the actuator number, L/S number, etc., of this operation step are ascertained, the procedure then moving on to step S92, where these items of data are displayed. The failure section which has been located in this way is highlighted in a predetermined color on the monitor screen of the display apparatus 8. Then, the recovery operation for the failure section is carried out by the operator.

Figure 24A:
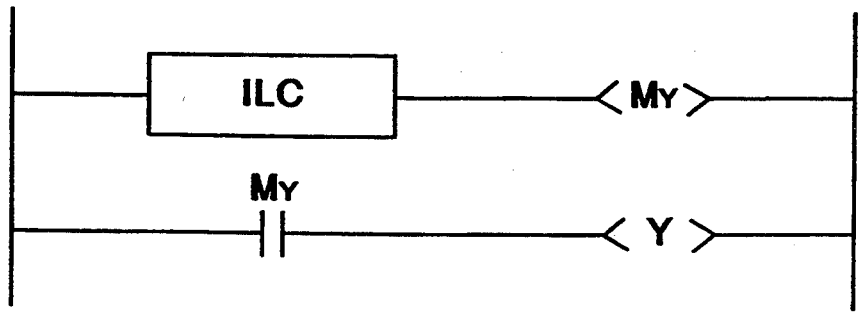
FIGS. 24 and 24B are diagrams illustrating, as compared with a prior-art system, the superiority of the failure detection system of the second embodiment, where a reference time is preset to be compared with the time it takes for the corresponding operation step to be carried out, thereby detecting any failure in the operation step.
Figure 24B:
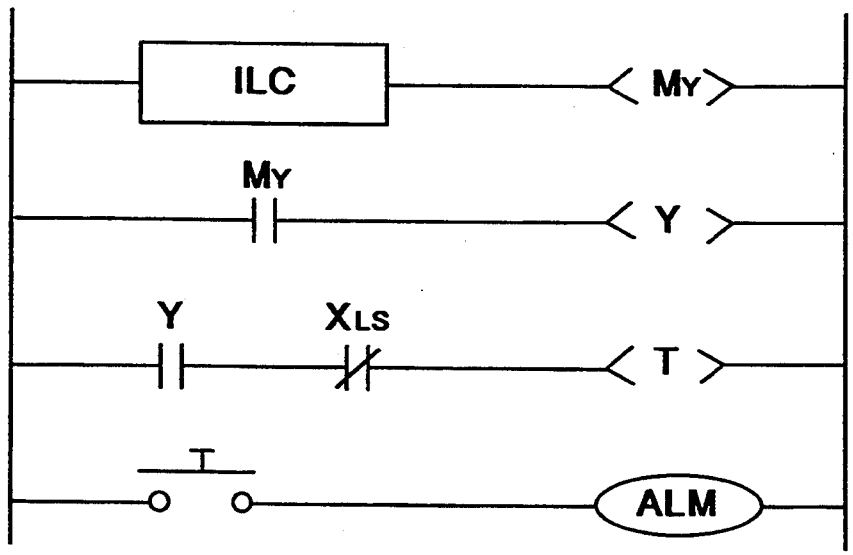

The detection of "step time over" and "step hang-up", described above, is basically performed by a program independent of the step ladder program 203. This is advantageous in that there is no need to provide a so-called "trap circuit" for detecting failures in the step ladder program. In part (b) of FIG. 24, the symbol $M_y$ indicates the output due to the fact that the interlock condition ILC has been satisfied. When this $M_y$ is emitted, the actuator output Y is emitted. Conventionally, there has been provided, as shown in FIG. 24(b), a timer circuit T adapted to be activated upon the closing of the switch $M_y$, the system being judged to be out of order unless a switch $X_{LS}$ for confirming the output Y is opened (ALM ON). In accordance with the second embodiment, however, such a timer circuit is unnecessary, it being only necessary to prepare a step ladder program needed for the production sequence control proper.

Recovery Operation

The detection/diagnosis method prepared for the system of the second embodiment is as described above. Next, a description will be given of a method of re-activating the entire system, in which a failure has been thus detected (the failure recovery sub-system 103 of FIG. 5).

As described in connection with FIG. 5, this recovery sub-system 103 performs recovery operation on the basis of the recovery program 102 generated beforehand. Therefore, the automatic generation of the recovery program in the present system will be described below.

Figure 25:
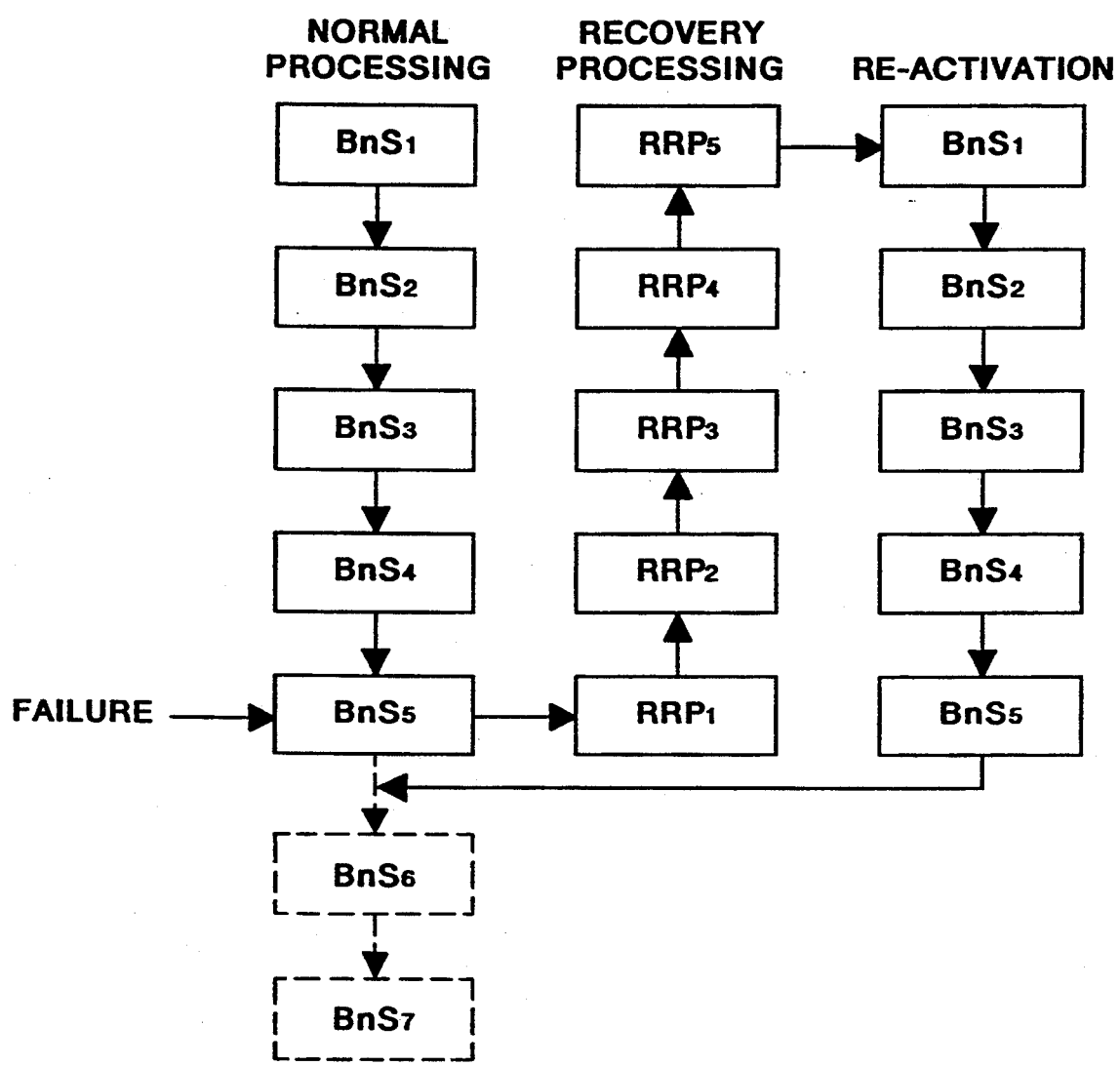
FIG. 25 is a diagram illustrating, on a principle basis, the restoration procedures in the second embodiment.

FIG. 25 illustrates the operational principle of the present recovery sub-system, in which, assuming that a failure has occurred in the operation step $B_nS_5$ of a block $B_n$ during the execution thereof, it has conventionally been the practice to manually make the operation proceed as: $B_nS_5 \rightarrow B_nS_6$. With this conventional method, however, not only is it impossible for the recovery processing to be automatized but also it frequently occurs that the step progress by manual operation comes to a standstill.

With the present recovery sub-system, the procedure moves backwards, as shown in FIG. 25, from the operation step $B_nS_5$, where the failure has occurred, to the operation step $B_nS_1$ at the head of this block $B_n$, re-activation being started with this head operation step $B_nS_1$. That is, assuming that the ladder program in the normal sequence control is the one shown in FIG. 15, the re-turning ladder program for recovery processing (referred to as "RRP") is as shown in FIG. 26. As will be seen by comparing FIG. 15 with FIG. 26, in this recovery ladder program RRP, the operation confirmation switch for the output $Y_n$ in an operation step is used as the manual interlock condition for the operation step in the previous stage.

This will be explained in more detail. In the step ladder program of FIG. 15, obtained by modifying the operation step map of FIG. 12. into a ladder program, the operation of the output $Y_1$ of the operation step $B_0S_1$ is confirmed by the switch $X_1$ and the output becomes the output $Y_2$ in the operation step $B_0S2$. The operation of this output $Y_2$ is confirmed by the switch $X_2$. In RRs of FIG. 26, on the other hand, the output $Y_2$ is emitted, in a manner, manually by closing the confirmation switch $X_3$ for the output $Y_3$, and, when the confirmation switch $X_2$ for this output $Y_2$ is closed, the output $Y_1$ is emitted in $RR_9$. Thus, in the recovery ladder program RRP, the confirmation switch for the output of the step ladder program SRP corresponding to the RRP is entered as the interlock condition for the after stage with respect to the RRP in question, whereby the backward control as described with reference to FIG. 25 is realized.

FIG. 21 is a flowchart of a program for automatically generating a returning ladder program RRP as described above. This program is in the sub-system 106 of FIG. 5 or stored in the automatic generation section 90 of FIG. 17.

When this automatic generation program is activated, the operator is urged, in step S150 of FIG. 21, to designate the number of the block, n, which is the object of automatic generation. In step S152, the operation step map corresponding to that block number is read. In step S154, a value m which corresponds to the step number of the sequence control ladder program SRP is initialized to the maximum value. In step S156, a value k corresponding to the step number of the recovery program RRP is initialized to "1". In step S158, the output $Y_m$ of $B_nS_m$ of the SRP is allocated to the output $Y_k$ Of $RRP_k$. In step S160, the confirmation switch $X_m$ for the output $Y_m$ of $B_nS_m$ is allocated to the interlock condition of $RRP_k$. In step S162, the value k is incremented, and in step S164, the value m is decremented by one. The above operations are repeated until the condition: m=0 is attained in step S166.

In this way, the recovery program 102 is automatically generated, and is stored in the hardware disk 77 without being activated unless a recovery switch (not shown) is depressed by the operator.

FIG. 22 shows the control procedures for the control program of the recovery sub-system adapted to be activated when the above-mentioned recovery switch is depressed by the operator. When a failure has occurred and that failure is due to step time over or step hang-up, the malfunctioning operation step is indicated in the block where the failure has occurred by the CS register in accordance with the control procedures of FIG. 20C and is at a stop. The other blocks are in the standby condition, waiting for the malfunctioning block to be re-activated. If the failure is due to block hang-up, the system waits for re-activation with the malfunctioning operation step having been located, in accordance with the control procedures of FIG. 20C. When, in FIG. 22, the switch is depressed, the malfunctioning block and the malfunctioning operation step located as described above are inputted in step S182. In step S184, the recovery program corresponding to the malfunctioning block is read from the disk 77, the program being loaded into the sequencer. In step S186, this recovery ladder program RRP is activated, starting from the step number k corresponding to the malfunctioning operation step ascertained in step S182. In step S188, the termination of this recovery program is waited for, and, in step S190, the step ladder program SRP is re-loaded into the sequencer, this ladder program being re-activated in step S192.

Advantages of the Second Embodiment

As described above, in accordance with the failure-detection/failure-diagnosis/recovery system of the second embodiment, the following merits are obtained:

① Failure detection can be effected easily and precisely by virtue of the step time over detection, step hang-up detection, and block hang-up detection.

That is, in the step time over detection and the step hang-up detection of the second embodiment, there is no need to incorporate a failure detection circuit in the ladder program as in the prior art, thus simplifying the system. In particular, in the step time over detection, the reference estimated time $\tau$ is updated on the basis of actual data, so that a high level of detection accuracy can be ensured.

Further, by incorporating a condition for block activation in the activating condition of each block, it is possible to recognize any failure condition in which the confirmation switch has got into a halfway state, as a block hang-up condition. This recognition enables such a failure condition to be detected as block hang-up in good time before the operation step has proceeded much too far, whereby it is possible to perform accurate failure diagnosis.

②By using the confirmation switch for the output Y of the sequence ladder program SRP as the interlock condition for the recovery ladder program RRP, the automatic generation of a recovery program can be effected very easily relying solely upon the operation step map. Further, by adopting a method in which the malfunctioning block is once restored to the initial condition by activating this recovery program before re-activating the same, recovery can be effected more reliably.

Modifications of the Second Embodiment

Various modifications of this invention are possible insofar as they do not depart from the spirit and scope of the same. For example, while the above embodiments have been described as applicable to a production line for automobiles, it goes without saying that the present invention is not restricted to that field. The present invention can be applied to any system where sequence control is performed.

The present invention is not limited to the above embodiments and various changes and modifications can be made within the spirit and scope of the present invention. Therefore, to apprise the public of the scope of the present invention the following claims are made.

What is claimed is:

1. A diagnostic method for a production line including a plurality of drive devices in which the operation of one of said drive devices is represented by at least one operation step, the operation of the entire production line is represented by a plurality of operation blocks, each said operation block includes at least one of said operation steps, each said operation step includes a checking operation by a confirmation device for confirming the operation of the corresponding drive device, and each of said operation blocks operates independently of the other operation blocks from the start to end thereof, said method comprising the steps of:
   a: storing a map in a memory, each element of the map representing a correspondence between said drive and confirmation devices and warning devices corresponding to each said operation step;
   b: preparing and executing a sequence ladder program in which the following program elements are described in a form in which they are connected in parallel with each other in said sequence ladder program:
      b1: program elements describing an operation of one of said drive devices and its corresponding confirmation device in the equipment of the production line;
      b2: program elements each adapted to measure the period between the time said one drive device starts an operation and the time a drive device which is in the subsequent stage with respect to said one drive device starts an operation; and
      b3: program elements each adapted to set one of said warning devices in an operating condition when the measured time period is longer than a corresponding preset reference time;
   c: locating, when any one said warning device operates, a drive device corresponding to said any one warning device on the basis of the map; and
   d: judging the located drive device or the confirmation device associated with the located drive device as a faulty device.

2. A method according to claim 1, wherein the confirmation device associated with the located drive device is judged to be faulty when it is in a non-operating condition.

3. A method according to claim 1, wherein when a reference operation time somewhat differs from the corresponding actual operation time, said reference operation time is corrected in accordance with the actual operation time.

4. A method according to claim 3, further comprising:
   calculating a standard deviation and a mean value of detected actual operation times; and
   correcting said reference operation time in accordance with the calculated standard deviation and mean value.

5. A diagnostic apparatus for diagnosing a production line controlled in accordance with a ladder program, including a plurality of program elements, and prepared on the basis of a map in which the operations of equipment comprised of a plurality of drive devices are described, said ladder program comprising a plurality of operation steps, each step including a drive device and confirmation device operated therein, said diagnostic apparatus comprising:
   memory means for storing in said map, reference operation times which are necessary for the execution of the program elements of said ladder program and which respectively correspond to the operations of the individual drive devices;
   register means for storing an identifier of a current operation step in said ladder program and an actual operation time required for a change to take place in the ON/OFF condition of a confirmation device of the current operation step;
   comparing means for comparing the actual operation time with the corresponding reference operation time as specified by the identifier; and
   locating means for locating, on the basis of a result from said comparing means, any malfunctioning step of said production line.

6. An apparatus according to claim 5, wherein said actual operation times and said reference operation times are stored in a single memory means, and wherein said actual operation times are updated and said actual operation times and said reference operation times are compared with each other each time the ON/OFF condition of a confirmation device is updated.

7. An apparatus according to claim 5, wherein when the reference operation time somewhat differs from the corresponding actual operation time, said reference operation time is corrected in accordance with the actual operation time.

8. A method according to claim 7, further comprising:
   calculating a standard deviation and a mean value of detected actual operation times; and
   correcting said reference operation time in accordance with the calculated standard deviation and mean value.

9. An apparatus according to claim 5, wherein said map is an operation step map including a drive condition for one of said drive devices, a condition for confirming the operation of said one drive device, said reference time, and said actual operation time, and said operation step map is prepared on the basis of an input/output map describing the input/output conditions for the individual drive devices and of the operational sequence of said drive devices in the production line.

10. An apparatus according to claim 5, wherein when said actual operation time is substantially equal to said reference time, it is determined that no failure has occurred.

11. An apparatus according to claim 5, wherein when said actual operation time is considerably longer than said reference time, it is determined that a failure has occurred.

12. A diagnostic method for a production line controlled in accordance with a ladder program, including a plurality of program elements, and prepared on the basis of a map describing the operations of equipment comprised of a plurality of drive devices, said method comprising the steps of:
   a: storing in said map, reference operation times necessary for the execution of the program elements of said ladder program and corresponding respectively to the operations of said drive devices;
   b: comparing the elapsed time after the execution start of each of said drive devices in said ladder program with the corresponding one of said reference operation times; and
   c: locating, on the basis of the results of said comparison, any malfunctioning section of said production line.

13. An apparatus according to claim 12, wherein said elapsed time and said reference operation time are stored in a single memory, and wherein, in said step b, said elapsed time is updated and compared with said reference operation time.

14. An apparatus according to claim 12, wherein said map is an operation step map including the drive condition for one of said drive devices, the condition for confirming the operation of said one drive device, said reference time, and said elapsed time, and
   said operation step map is prepared on the basis of an input/output map describing the input/output conditions for the individual drive devices and of the operational sequence of said drive devices in the production line.

15. An apparatus according to claim 12, wherein when, in step b, said elapsed time has exceeded said reference time, it is determined that a failure has occurred.

16. A diagnostic method for a production line comprising a plurality of drive devices in which the operation of one drive device is represented by at least one operation step, the operation of the entire production line is represented by a plurality of operation blocks, each operation block includes at least one of said operation steps, each operation step includes a confirming operation by a confirmation device for confirming the operation of the corresponding drive device, and each one of said operation blocks operates independently of the other operation blocks from the start to end thereof; said method comprising the steps of:
   a: checking, when activating a ladder program of one operation block, the conditions of all the output confirmation devices of the operation steps of those operation blocks which are on the upstream side of and connected with said one operation block; and
   b: determining that a failure has occurred when the condition of any one of said output confirmation devices is different from a predetermined corresponding condition.

17. A method according to claim 16, wherein when said production line is at a stop, checking is performed on the condition of the output confirmation device in each of the operation steps of those operation blocks which are on the upstream side of and connected with any of said operation blocks which has not been activated, whereby any malfunctioning section is located.

18. A method according to claim 16, wherein the period between the termination of the operations of one block and the activation of the operation block which is on the downstream side of said one operation block, is monitored, thereby locating any of said operation blocks which has not been activated.

* * * * *

UNITED STATES PATENT AND TRADEMARK OFFICE
CERTIFICATE OF CORRECTION

PATENT NO. : 5,410,469

DATED : April 25, 1995

INVENTOR(S) : Shunji SAKAMOTO et al.

Page 1 of 2

It is certified that error appears in the above-indentified patent and that said Letters Patent is hereby corrected as shown below:

On the title page, item [56]:

Under "References Cited", please insert

--OTHER PUBLICATIONS

Patent abstracts of Japan, unexamined applications, P field Vol. 10, No. 106, April 22, 1986, The Patent Office Japanese Government, page 156, p 449 * Kokai-No. 60-238 906 (MISUZU).--;

In the Abstract, Section [57], line 2, after "is" insert --controlled--;

Column 6, line 25, after "pared", delete ":";

Column 11, line 45, delete second occurrence of "system";

UNITED STATES PATENT AND TRADEMARK OFFICE
CERTIFICATE OF CORRECTION

PATENT NO. : 5,410,469
DATED : April 25, 1995
INVENTOR(S) : Shunji SAKAMOTO et al.

It is certified that error appears in the above-indentified patent and that said Letters Patent is hereby corrected as shown below:

Column 12, line 4, after "curred", insert --.-- (period);

Column 12, line 7, change "etc" to --etc.,--

Column 12, line 8, change "below" to --below.--;

Column 21, line 22, change "BO" to --Bo--.

Column 22, line 58, change "the-operation" to --the operation--;

Column 25, line 40, change ""return"" to --"return",--;

Column 31, line 50, change "RRs" to --RR$_8$--;

Column 32, line 8, change "Of" to --of--.

Signed and Sealed this

Twelfth Day of December, 1995

Attest:

BRUCE LEHMAN

Attesting Officer

Commissioner of Patents and Trademarks